US009648523B2

(12) United States Patent
Balasubramanian et al.

(10) Patent No.: US 9,648,523 B2
(45) Date of Patent: May 9, 2017

(54) TARGET ACCESS POINT INITIATED COMMUNICATION HANDOVER

(75) Inventors: Srinivasan Balasubramanian, San Diego, CA (US); Jen Mei Chen, San Diego, CA (US); Manoj M. Deshpande, San Diego, CA (US); Mehmet Yavuz, San Diego, CA (US); Sanjiv Nanda, Ramona, CA (US); Gavin B. Horn, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1055 days.

(21) Appl. No.: 12/274,901

(22) Filed: Nov. 20, 2008

(65) Prior Publication Data

US 2009/0129341 A1  May 21, 2009

Related U.S. Application Data

(60) Provisional application No. 60/989,576, filed on Nov. 21, 2007.

(51) Int. Cl.
*H04W 36/00* (2009.01)
*H04W 36/04* (2009.01)
*H04W 84/04* (2009.01)

(52) U.S. Cl.
CPC ........ *H04W 36/0055* (2013.01); *H04W 36/04* (2013.01); *H04W 84/045* (2013.01)

(58) Field of Classification Search
None
See application file for complete search history.

(56) References Cited

U.S. PATENT DOCUMENTS 7,139,575 B1 * 11/2006 Chen et al. ............... 455/437
7,197,310 B2 *  3/2007 Gehlot et al. ............ 455/440
(Continued)

FOREIGN PATENT DOCUMENTS

EP   0504122 A2 *  9/1992
EP   1732269 A1    12/2006
(Continued)

OTHER PUBLICATIONS

International Search Report & Written Opinion—PCT/US2008/084417, International Search Authority—European Patent Office—Apr. 22, 2009.
(Continued)

*Primary Examiner* — Steve Young
(74) *Attorney, Agent, or Firm* — Ke Liu

(57) ABSTRACT

In a handover operation an access terminal is handed over from a source access point to a target access point. To facilitate efficient identification of a target access point, a handover operation may be initiated by the target access point. A candidate frequency search also may be invoked to confirm that an access terminal identified by a target access point for a handover is in the vicinity of the target access point. A source access point may verify whether an access terminal is in a vicinity of a target access point to determine whether to perform a handover operation. A source access point may handle potential ambiguity between several target access points by sending handover commands to each of these target access points. An access terminal also may assist in the determination of whether to perform a handover operation.

64 Claims, 19 Drawing Sheets

(56) References Cited

U.S. PATENT DOCUMENTS

| | | | |
|---|---|---|---|
| 7,613,444 | B2 | 11/2009 | Lindqvist et al. |
| 2003/0040331 | A1* | 2/2003 | Zhao .................... 455/552 |
| 2004/0192284 | A1 | 9/2004 | Vaisanen et al. |
| 2005/0037758 | A1* | 2/2005 | Rimoni ............ H04W 36/0061 455/436 |
| 2005/0073977 | A1* | 4/2005 | Vanghi ............. H04W 36/0066 370/335 |
| 2005/0192012 | A1* | 9/2005 | Choi .................... H04W 36/06 455/442 |
| 2007/0025296 | A1* | 2/2007 | Jung et al. .................... 370/331 |
| 2008/0014956 | A1 | 1/2008 | Balasubramanian |
| 2008/0161000 | A1 | 7/2008 | Li et al. |
| 2008/0225797 | A1* | 9/2008 | Kim ................. H04W 36/0083 370/331 |
| 2008/0318576 | A1 | 12/2008 | So et al. |
| 2009/0052395 | A1* | 2/2009 | Bao et al. .................... 370/331 |
| 2009/0103503 | A1 | 4/2009 | Chhabra |
| 2009/0310559 | A1 | 12/2009 | Chen et al. |
| 2010/0093351 | A1* | 4/2010 | Barrett ............. H04W 36/0083 455/436 |
| 2010/0130212 | A1 | 5/2010 | So et al. |
| 2011/0003597 | A1 | 1/2011 | Budic et al. |
| 2011/0014920 | A1 | 1/2011 | Nylander et al. |

FOREIGN PATENT DOCUMENTS

| | | |
|---|---|---|
| JP | 5068285 A | 3/1993 |
| JP | 8037680 A | 2/1996 |
| KR | 100883268 B1 | 2/2009 |
| WO | WO0028768 A1 | 5/2000 |
| WO | 2006016330 A1 | 2/2006 |
| WO | WO2007040450 A1 | 4/2007 |
| WO | WO2009067700 | 5/2009 |

OTHER PUBLICATIONS

C. Chou, et al., "HO between IFEE802.16m femto cell and macro cell" Oct. 31, 2008 (Oct. 31, 2008), pp. 1-9, XP002603660.
International Search Report and Written Opinion—PCT/US2010/041681, International Search Authority—European Patent Office—Dec. 13, 2010.
S. Jung, et al., ; "Proposed IEEE 802.16m Amendment Text on Femtocell BS Support". Jul. 6, 2009 (Jul. 6, 2009), pp. 1-10, XP002603661, Retrieved from the Internet: URL:http:// www.ieee802.org/16/tgm/older_index.html [retrieved on Oct. 5, 2010] p. 6, paragraph 15.2.x.6.1—p. 7, paragraph 15.2.x.6.1.
Taiwan Search Report—TW097145278—TIPO—Oct. 24, 2012.

* cited by examiner

TARGET ACCESS POINT INITIATED COMMUNICATION HANDOVER

CLAIM OF PRIORITY UNDER 35 U.S.C. §119

This application claims the benefit of and priority to commonly owned U.S. Provisional Patent Application No. 60/989,576, filed Nov. 21, 2007, the disclosure of which is hereby incorporated by reference herein.

BACKGROUND

Field

This application relates generally to communication and more specifically, but not exclusively, to communication handover schemes.

Introduction

Wireless communication systems are widely deployed to provide various types of communication (e.g., voice, data, multimedia services, etc.) to multiple users. As the demand for high-rate and multimedia data services rapidly grows, there lies a challenge to implement efficient and robust communication systems with enhanced performance.

To supplement conventional mobile phone network base stations (e.g., macro cells), small-coverage base stations may be deployed (e.g., installed in a user's home) to provide more robust indoor wireless coverage to mobile units. Such small-coverage base stations are generally known as access point base stations, Home NodeBs, or femto cells. Typically, such small-coverage base stations are connected to the Internet and the mobile operator's network via a DSL router or a cable modem.

In practice, these small-coverage base stations may be deployed in relatively large numbers in a given area (e.g., throughout a macro cell). As a mobile unit roams through such an area, it may be desired to handover the mobile unit to one of these base stations. Consequently, there is a need for effective techniques for identifying an appropriate base station for a handover and accomplishing the handover in a network that employs a relatively large number of base stations.

SUMMARY

A summary of sample aspects of the disclosure follows. It should be understood that any reference to the term aspects herein may refer to one or more aspects of the disclosure.

The disclosure relates in some aspects to handover operations where an access terminal is handed over from a source access point to a target access point. For example, an access terminal that is actively communicating with a macro access point may be handed over to a femto node. Here, provisions are made to facilitate efficient identification of the target access point (e.g., when there are a large number of access points in the area of interest).

The disclosure relates in some aspects to handover operations that are initiated by a target access point. For example, a target access point may perform off-frequency scans to detect a signal from a specific access terminal. In the event such a signal is detected, the target access point may send a message to the source access point requesting that the access terminal be directed to the target access point.

The disclosure relates in some aspects to invoking a candidate frequency search to confirm that an access terminal identified by a target access point for a handover is in the vicinity of the target access point. For example, in response to a target access point informing a source access point that the target access point has detected a signal from a given access terminal, the source access point may send a request to the identified access terminal to perform a candidate frequency search.

The disclosure relates in some aspects to a source access point that verifies whether an access terminal is in a vicinity of a target access point to determine whether to perform a handover operation. For example, the source access point may receive information indicative of the locations of the target access point and the access terminal. In some cases the information indicative of the location of the target access point comprises one or more metrics. In these cases, the source access point compares the metric(s) with the information received from the access terminal to determine whether the access terminal is in the vicinity of the target access point.

The disclosure relates in some aspects to a source access point that handles potential ambiguity between several target access points by sending handover commands to each of these target access points. For example, if the source access point receives a candidate frequency search report from an access terminal that indicates that several access points are using the same PN sequence, the source access point may instruct each of these access points to use the same set of channel assignment parameters for a potential handover of the access terminal.

The disclosure relates in some aspects to an access terminal that provides information that is used to cause the access terminal to be handed over to a target access point. In some aspects, the access terminal may commence monitoring for signals from a given access point when the access terminal determines that it is in the vicinity of that access point. In some aspects, the access terminal may detect a signal from a given access point using a threshold that is specified for that particular access point or for a defined set of access points.

BRIEF DESCRIPTION OF THE DRAWINGS

These and other sample aspects of the disclosure will be described in the detailed description and the appended claims that follow, and in the accompanying drawings, wherein:

Figure 1:
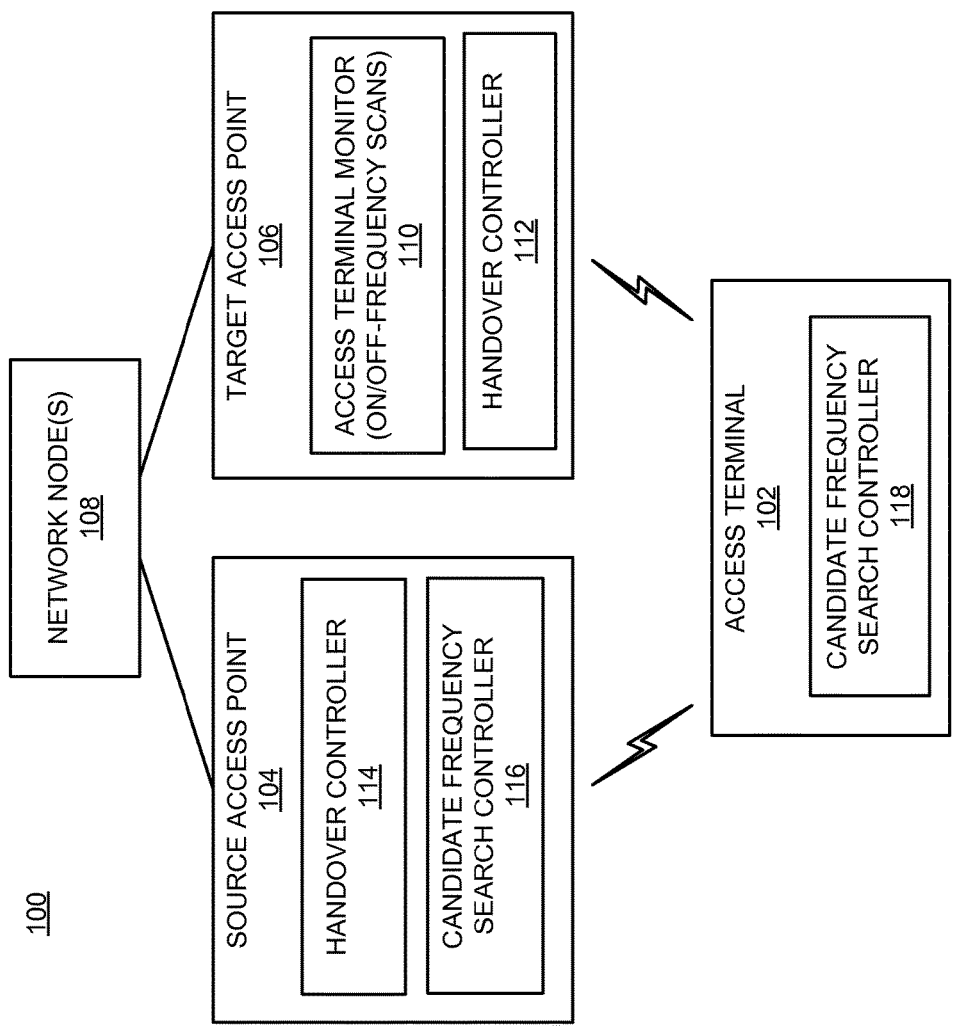
FIG. 1 is a simplified block diagram of several sample aspects of a communication system where an access terminal may be handed over from a source access point to a target access point.

In accordance with common practice the various features illustrated in the drawings may not be drawn to scale. Accordingly, the dimensions of the various features may be arbitrarily expanded or reduced for clarity. In addition, some of the drawings may be simplified for clarity. Thus, the drawings may not depict all of the components of a given apparatus (e.g., device) or method. Finally, like reference numerals may be used to denote like features throughout the specification and figures.

DETAILED DESCRIPTION

Various aspects of the disclosure are described below. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. Furthermore, an aspect may comprise at least one element of a claim.

FIG. 1 illustrates several nodes in a sample communication system 100 (e.g., a portion of a communication network). For illustration purposes, various aspects of the disclosure will be described in the context of one or more access terminals, access points, and network nodes that communicate with one another. It should be appreciated, however, that the teachings herein may be applicable to other types of apparatuses or other similar apparatuses that are referenced using other terminology (e.g., base stations, user equipment, and so on).

Access points in the system 100 provide one or more services (e.g., network connectivity) for one or more wireless terminals (e.g., access terminal 102) that may be installed within or that may roam throughout an associated geographical area. For example, at various points in time the access terminal 102 may connect to an access point 104 or an access point 106. Each of the access points 104 and 106 may communicate with one or more network nodes (represented, for convenience, by network node 108) to facilitate wide area network connectivity. Such network nodes may take various forms such as, for example, one or more radio and/or core network entities (e.g., a mobile switching center, a mobility management entity, or some other suitable network entity).

When the access terminal 102 is in a connected state (e.g., during an active call) the access terminal 102 may be served by the access point 104 (e.g., a source access point). As the access terminal 102 moves closer to the access point 106, however, it may be desired that the access terminal 102 be connected instead to the access point 106. For example, the access point 106 may provide additional services for the access terminal 102 or the access terminal 102 may receive stronger signals from the access point 106 than from the access point 104. Consequently, at some point, the access terminal 102 will be handed to the access point 106 from the access point 104. For such handover operations, the access point 104 may be referred to as the source access point and the access point 106 may be referred to as the target access point.

In a conventional handover procedure, a source access point detects the trigger conditions for a handover to a target access point. Such a handover decision may be based on, for example, the round trip delay ("RTD") experienced in the current active set of the access terminal or based on a report by the access terminal of a beacon (pilot) deployed in the border of a target network. In cases where the number of access points in a given area is relatively large, however, it may be relatively inefficient for a source access point to trigger a handover. For example, it may difficult for a source access point to determine the correct access point to which an access terminal is to be handed over when there are a large number of nearby access points. Moreover, it may difficult for a source access point to determine whether a potential target access point is suitable for a handover operation.

FIG. 1 and the disclosure that follows describe various techniques for handing over an access terminal from one access point to another. Advantageously, these techniques may be effectively employed even in situations where there are a large number of access points in a given area.

The disclosure relates in some aspects to a decentralized handover scheme where target access points trigger handover operations. For example, the access point 106 may employ an access terminal monitor 110 that monitors for a signal from a specified access terminal (e.g., by conducting on-frequency scans and off-frequency scans). Once the access terminal monitor 110 detects such a signal, a handover controller 112 of the access point 106 may initiate handover operations. This may involve, for example, sending a message to a handover controller 114 of the access point 104 that requests the access point 104 to commence certain handover-related operations. An example of such a scheme is described below in conjunction with FIG. 4.

The disclosure relates in some aspects to verifying that an access terminal detected by an access point is able to communicate with the access point before commencing certain handover operations. Here, detection of an access terminal signal by an access point may not guarantee that the access terminal is able to receive signals from the access point. Consequently, an access point may be configured to verify that an access terminal is near a target access point in conjunction with initiating a handover operation.

In some cases, a target access point may verify whether an access terminal is near the target access point. For example, the access terminal monitor 110 may acquire messages transmitted by the access terminal that indicate the location of the access terminal. The handover controller 112 may then determine whether to invoke handover operations based on this information. An example of such a scheme is described below in conjunction with FIG. 5.

In some cases, before commencing handover operations, a source access point may verify that an access terminal is in the vicinity of a target access point by requesting the access terminal to monitor for access point signals (e.g., signals from a specified access point). For example, in some implementations the access point 104 includes a candidate frequency search controller 116 that may send a request to the access terminal 102 to perform a candidate frequency search. The access terminal 102, in turn, may include a candidate frequency search controller 118 that performs the requested search and provides a report indicative of, for example, the signals (e.g., pilot signals) heard during the search. In the event the access terminal 102 received a signal from the access point 106, the handover controller 114 may proceed with the handover. Such a scheme may be employed, for example, in conjunction with the operations of FIGS. 5 and 7.

In some cases, a source access point may verify whether an access terminal is near a target access point based on metrics received from the target access point. For example, upon detection of a signal at the access terminal monitor 110, the handover controller 112 may send a message to the handover controller 114 that indicates that a signal was detected and that also includes metrics that are indicative of the location of the access point 106. The handover controller 114 may then compare these metrics with, for example, information obtained from a candidate frequency search to determine whether the access terminal 102 is in the vicinity of the access point 106. The handover controller 114 may then determine whether to invoke handover operations based on this determination. An example of such a scheme is described below in conjunction with FIG. 7.

Figure 2:
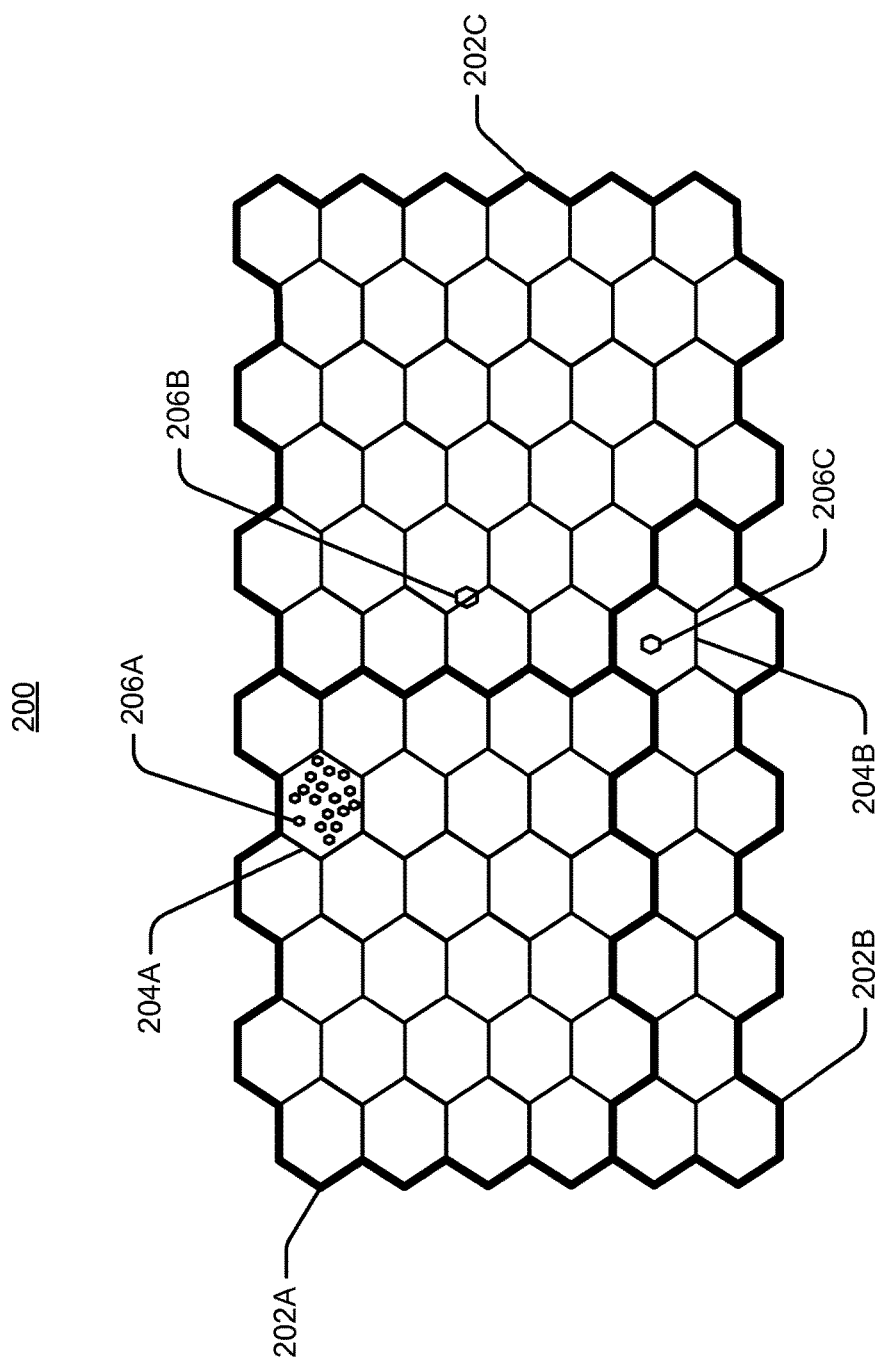
FIG. 2 is a simplified diagram illustrating sample coverage areas for wireless communication.

Handover operations such as those described above may be advantageously employed in a network 200 as shown in FIG. 2 where some access points provide macro coverage and other access points provide smaller coverage. Here, macro coverage areas 204 may be provided by, for example, macro access points of a large area cellular network such as a 3G network, typically referred to as a macro cell network or a wide area network ("WAN"). In addition, smaller coverage areas 206 may be provided by, for example, access points of a residence-based or building-based network environment, typically referred to as a local area network ("LAN"). As an access terminal ("AT") moves through such a network, the access terminal may be served in certain locations by access points that provide macro coverage while the access terminal may be served at other locations by access points that provide smaller coverage. In some aspects, the smaller coverage access points may be used to provide incremental capacity growth, in-building coverage, and different services, all leading to a more robust user experience.

As indicated by the small cells (e.g., coverage area 206A) in the macro coverage area 204A, a large number of small coverage access points may deployed in a given area of a network. In such a case, the teachings herein may be advantageously employed to perform handovers to these access points.

In the description herein, a node (e.g., an access point) that provides coverage over a relatively large area may be referred to as a macro node while a node that provides coverage over a relatively small area (e.g., a residence) may be referred to as a femto node. It should be appreciated that the teachings herein may be applicable to nodes associated with other types of coverage areas. For example, a pico node may provide coverage over an area that is smaller than a macro area and larger than a femto area (e.g., coverage within a commercial building). Also, a relay node may provide wireless coverage that enables an access point to communicate with other nodes in a network. In other words, a relay node may provide a wireless backhaul that facilitates connectivity to, for example, a network node or another relay node. In various applications, other terminology may be used to reference a macro node, a femto node, or other access point-type nodes. For example, a macro node may be configured or referred to as an access node, base station, access point, eNodeB, macro cell, and so on. Also, a femto node may be configured or referred to as a Home NodeB, Home eNodeB, access point base station, access point base station, eNodeB, femto cell, and so on. In some implementations, a node may be associated with (e.g., divided into) one or more cells or sectors. A cell or sector associated with a macro node, a femto node, or a pico node may be referred to as a macro cell, a femto cell, or a pico cell, respectively. For convenience, the description herein may refer generally to operations and components of access points and femto nodes. It should be appreciated that these operations and components also may be applicable to other types of nodes (e.g., relay nodes and pico nodes).

In the example of FIG. 2, several tracking areas 202 (or routing areas or location areas) are defined, each of which includes several macro coverage areas 204. Here, areas of coverage associated with tracking areas 202A, 202B, and 202C are delineated by the wide lines and the macro coverage areas 204 are represented by the hexagons. As mentioned above, the tracking areas 202 also may include femto coverage areas 206. In this example, each of the femto coverage areas 206 (e.g., femto coverage area 206C) is depicted within one or more macro coverage areas 204 (e.g., macro coverage area 204B). It should be appreciated, however, that a femto coverage area 206 may not lie entirely within a macro coverage area 204. Also, one or more pico or femto coverage areas (not shown) may be defined within a given tracking area 202 or macro coverage area 204.

With the above overview in mind, various techniques that may be employed to perform handoffs in accordance with the teachings herein will be described with reference to FIGS. 3-12. For illustration purposes the following describes a scenario where an access terminal is handed over from a macro access point to a femto node. It should be understood that the teachings herein may be applicable to a handover between other types of nodes.

Figure 3:
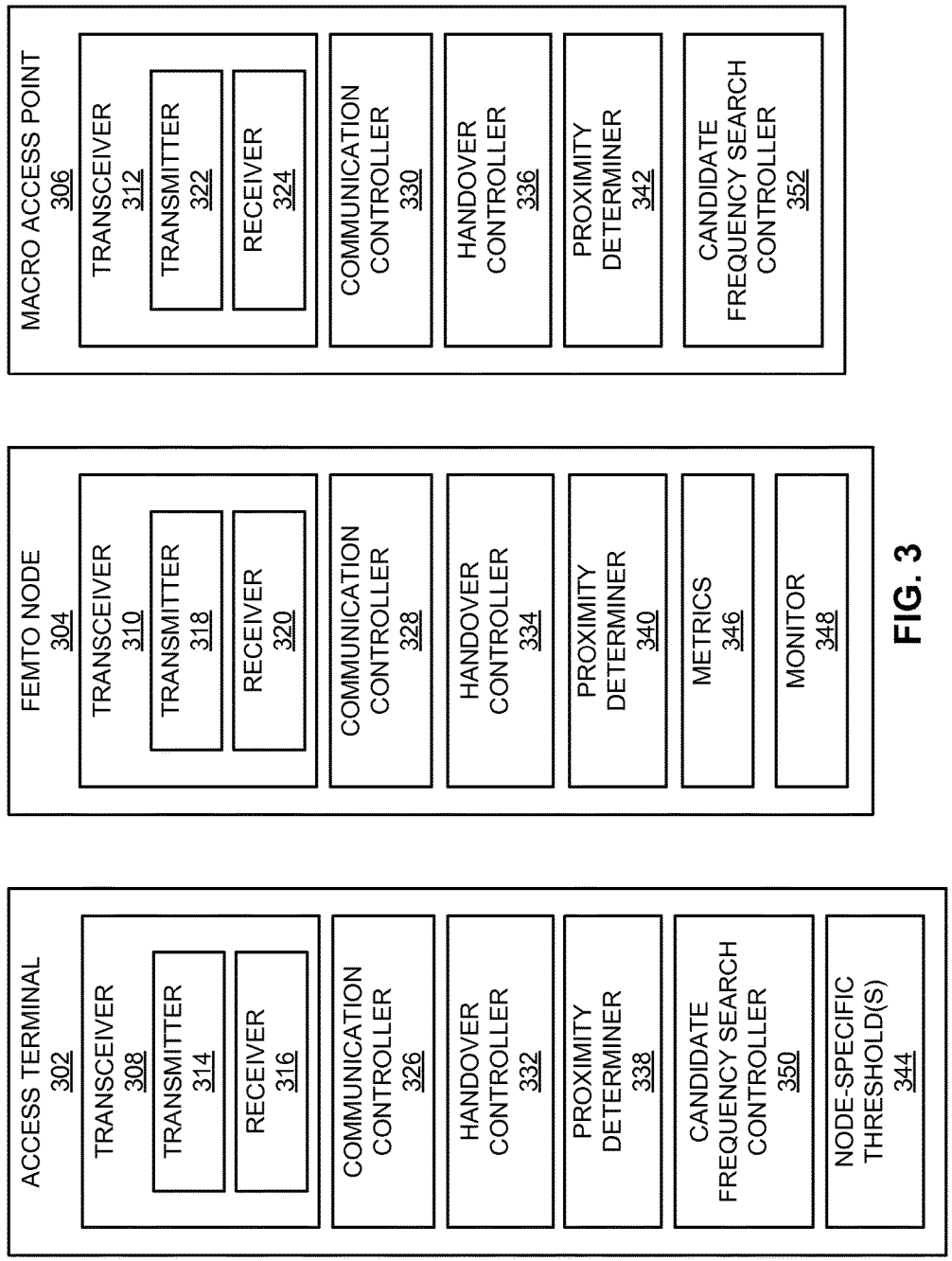
FIG. 3 is a simplified block diagram of several sample aspects of components that may be employed in communication nodes.

For illustration purposes the operations of FIGS. 4-12 (or any other operations discussed or taught herein) may be described as being performed by specific components (e.g., components of the system 100 and/or the components shown in FIG. 3). It should be appreciated, however, that these operations may be performed by other types of components and may be performed using a different number of components. It also should be appreciated that one or more of the operations described herein may not be employed in a given implementation.

FIG. 3 illustrates several sample components that may be incorporated into nodes such as an access terminal 302 (e.g., corresponding to access terminal 102 in FIG. 1), a femto node 304 (e.g., corresponding to access point 106), and a macro access point 306 (e.g., corresponding to access point 104) to perform handover operations as taught herein. The described components also may be incorporated into other nodes in a communication system. For example, other nodes (e.g., other access points) in a system may include components similar to those described for the femto node 304 and/or the macro access point 306 to provide similar functionality.

As shown in FIG. 3, the nodes 302, 304, and 306 include transceivers 308, 310, and 312, respectively, for communicating with other nodes. The transceiver 308 includes a transmitter 314 for sending signals (e.g., messages) and a receiver 316 for receiving signals (e.g., including configuration-related information). The transceiver 310 includes a transmitter 318 for sending signals and a receiver 320 for receiving signals. The transceiver 312 includes a transmitter 322 for sending signals and a receiver 324 for receiving signals.

The nodes of FIG. 3 also include other components that may be used in conjunction with handover operations as taught herein. For example, the nodes 302, 304, and 306 may include communication controllers 326, 328, and 330, respectively, for managing communication with other nodes (e.g., sending and receiving messages/indications) and for providing other related functionality as taught herein. Also one or more of the nodes 302, 304, and 306 may include handover controllers 332, 334, and 336, respectively, for performing handover-related operations and for providing other related functionality as taught herein. One or more of the nodes 302, 304, and 306 may include proximity determiners 338, 340, and 342, respectively, for performing proximity-related operations (e.g., determining whether the access terminal 302 is within the vicinity of the femto node 304) and for providing other related functionality as taught herein. Sample operations of the other components of FIG. 3 are described below.

For convenience, the nodes of FIG. 3 are depicted as including components that may be used in the various examples described below in conjunction with FIGS. 4-12. In practice, one or more of the illustrated components may not be used in a given example. As an example, in some implementations the access terminal 302 may not include the proximity determiner 338 and/or node-specific threshold(s) 344. As another example, in some implementations the femto node 304 may not include one or more of the proximity determiner 340 and/or metrics 346. As yet another example, in some implementations the macro access point 306 may not include the proximity determiner 342.

Also, a given node may contain one or more of the described components. For example, a node may contain multiple transceiver components that enable the node to concurrently operate on multiple frequencies and/or enable the node to communicate via different types of technology (e.g., wired and/or wireless technology).

Figure 4:
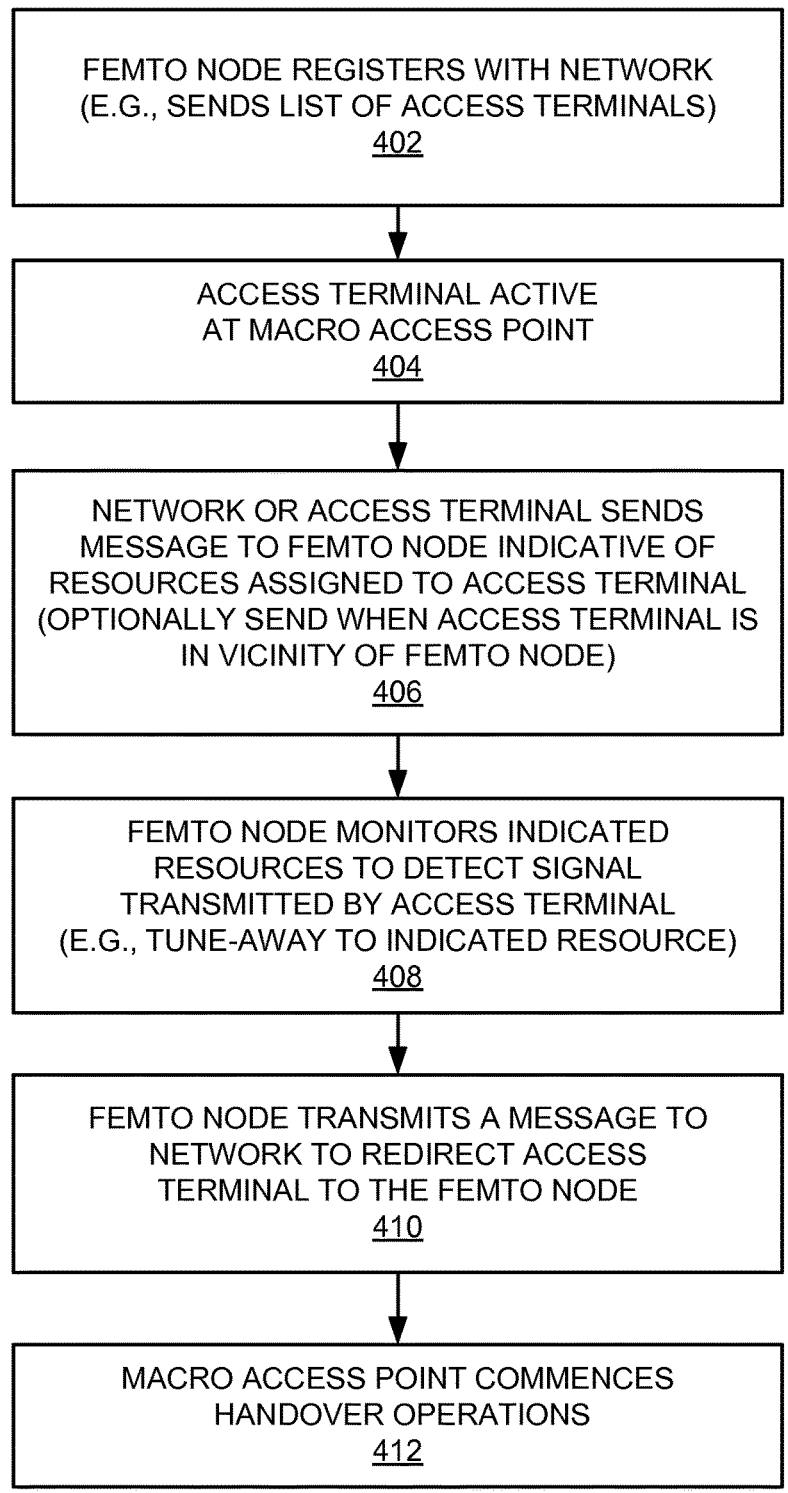
FIG. 4 is a flowchart of several sample aspects of operations where a handover is initiated by a target access point.

Referring now to FIG. 4, when an access terminal that is communicating on a macro network approaches an associated femto node (e.g., a home femto node) it may be desirable to hand over the access terminal to the femto node so that the access terminal may receive service from the femto node. In practice, however, it may be undesirable to require the access terminal to scan for signals from the femto node to determine whether the access terminal is close enough to the femto node for handover. For example, if such scanning is performed frequently, the talk-time of the access terminal may be appreciably reduced.

FIG. 4 describes a scheme where the femto node monitors for signals from the access terminal to invoke a handover operation. Here, since the femto node may be lightly loaded, these monitoring operations may not significantly affect the performance of the femto node. This scheme may provide an efficient way to accomplish handover with requiring that the access terminals scan for femto nodes and without requiring that the network keep track of the locations of the femto nodes in the network for handover operations. For purposes of illustration, the operations of FIG. 4 are described in the context of the nodes of FIG. 3.

As represented by block 402, at some point in time the femto node 304 registers with the network (e.g., when the femto node 304 is deployed or initialized). In conjunction with this registration, the macro network (e.g., macro access point 206) may discover which access terminals are allowed to access the femto node 304 (e.g., in the event the femto node 304 is restricted as taught herein).

As represented by block 404, at some point in time the access terminal 302 will be an active communication with the macro network (e.g., the access terminal establishes a connection with the macro access point 306). To enable this communication, the macro network (e.g., the macro access point 306) will assign a set of resources to the access terminal. Such resources may relate to, for example, active set members, the channel or channels upon which the access point may communicate with the macro network, a scrambling code, and MAC ID resources used by the access terminal.

As represented by block 406, a message is sent to the femto node 304 that informs the femto node 304 of the resources that have been assigned to the access terminal 302. In some cases this message is sent by a network entity (e.g., a central server that monitors access terminals operating in the macro network). In some cases this message is sent by a macro access point (e.g., a macro access point in the neighborhood of the femto node or the access point that is currently serving the access terminal). In some cases this message is sent by an access terminal.

This resource information may be sent to the femto node 304 at various times. For example, in some cases this information may be sent when the femto node 304 registers with the network as described above the block 402 (e.g., if the access terminal 302 is active when the femto node 304 registers). In some cases the femto node 304 may request this information.

In some cases this information may be sent to the femto node 304 if it is determined that the access terminal 302 is within a defined vicinity of the femto node 304. For example, the access point 306 (e.g., the proximity determiner 342), the access terminal 302 (e.g., the proximity determiner 338), or some other node may maintain information indicative of the location of the femto node 304. In addition, any of these entities may track the location of the access terminal 302 such that it may be determined when the access terminal 302 is in the vicinity of the femto node 304. In some cases, an indication that the access terminal 302 in the vicinity of the femto node 304 may be sent to the femto node 304 independently of the resource information.

In some cases the message may include information that the femto node 304 (e.g., the proximity determiner 340) may use to determine the location of the access terminal 302. For example, the message may include the location of the access terminal 302 or a pilot strength report from the access terminal 302.

As represented by block 408, the femto node (e.g., a monitor 348 that cooperates with the receiver 320) may then monitor the indicated resources to detect the access terminal 302. For example, the femto node 304 may tune-away from its current operating frequency band (e.g., switch to a frequency band specified by the resources) to monitor for signals transmitted by the access terminal 302. Here, the femto node 304 may determine which channel or channels (e.g., access channels, control channels, data channels) it should monitor based on the received resource information.

In some implementations the femto node 304 may employ a frequency division duplex scheme whereby the femto node 304 may not interrupt current transmissions when it tunes away to monitor for signals from the access terminal 302. Here, the femto node 304 may align its control channels at an offset from the control channels of the macro network so that the femto node 304 may tune away to the macro network and still maintain any active connections.

In some implementations the femto node 304 may include multiple receivers. In such a case, the femto node 304 may not need to perform a tune-away from its current frequency band to monitor for signals from the access terminal 302 on another frequency band (e.g., a macro channel).

The operations of block 408 may be performed at various times. For example, in some scenarios the femto node 304 may be configured to continually monitor for signals from the access terminal 302. In some scenarios the femto node 304 may be configured to monitor for signals from the access terminal 302 when the femto node 304 receives an indication that the access terminal 302 is active. In some scenarios the femto node 304 may be configured to monitor for signals from the access terminal 302 when the access terminal 302 is within the vicinity of the femto node 304.

As represented by block 410, if the femto node 304 detects the access terminal 302, the femto node 304 may transmit a message to the macro network to redirect the access terminal 302 to the femto node 304. For example, the femto node 304 (e.g., the handover controller 334) may send a message to the macro access point 306 that is currently serving the access terminal 302, whereby the message instructs the macro access point 306 to hand over the access terminal 302. Here, detection of the access terminal 302 may be indicated by receipt of signal from the access terminal 302 having a signal strength that is greater than or equal to a threshold.

As represented by block 412, in response such a message, the source access point (e.g., the handover controller 336) may commence handover operations. This may involve, for example, transferring the active call context from the source access point 306 to the femto node 304 (the target access point). This active call context may indicate, for example, the service options that are currently active and the types of channels allocated to it. The macro access point 306 (e.g., the handover controller 336) may then send a redirect message to the access terminal (e.g., to the handover controller 332) to perform the handover. Advantageously, through the use of such a decentralized handover scheme, the macro network does not need to maintain a central database of the locations of every femto node in the network to identify target femto nodes for handover operations.

Figure 5:
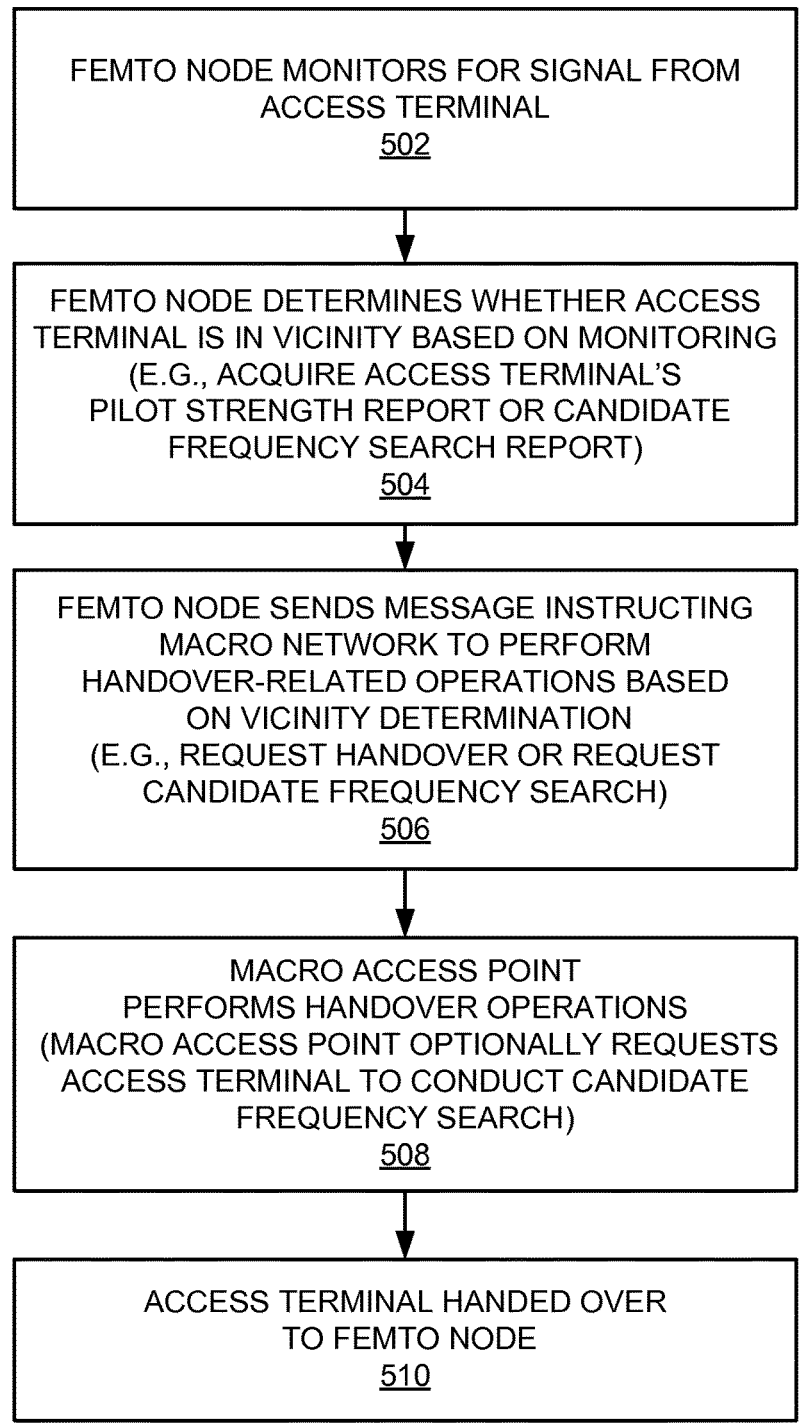
FIG. 5 is a flowchart of several sample aspects of handover operations where a target access point determines whether an access terminal is in the vicinity.
Figure 7:
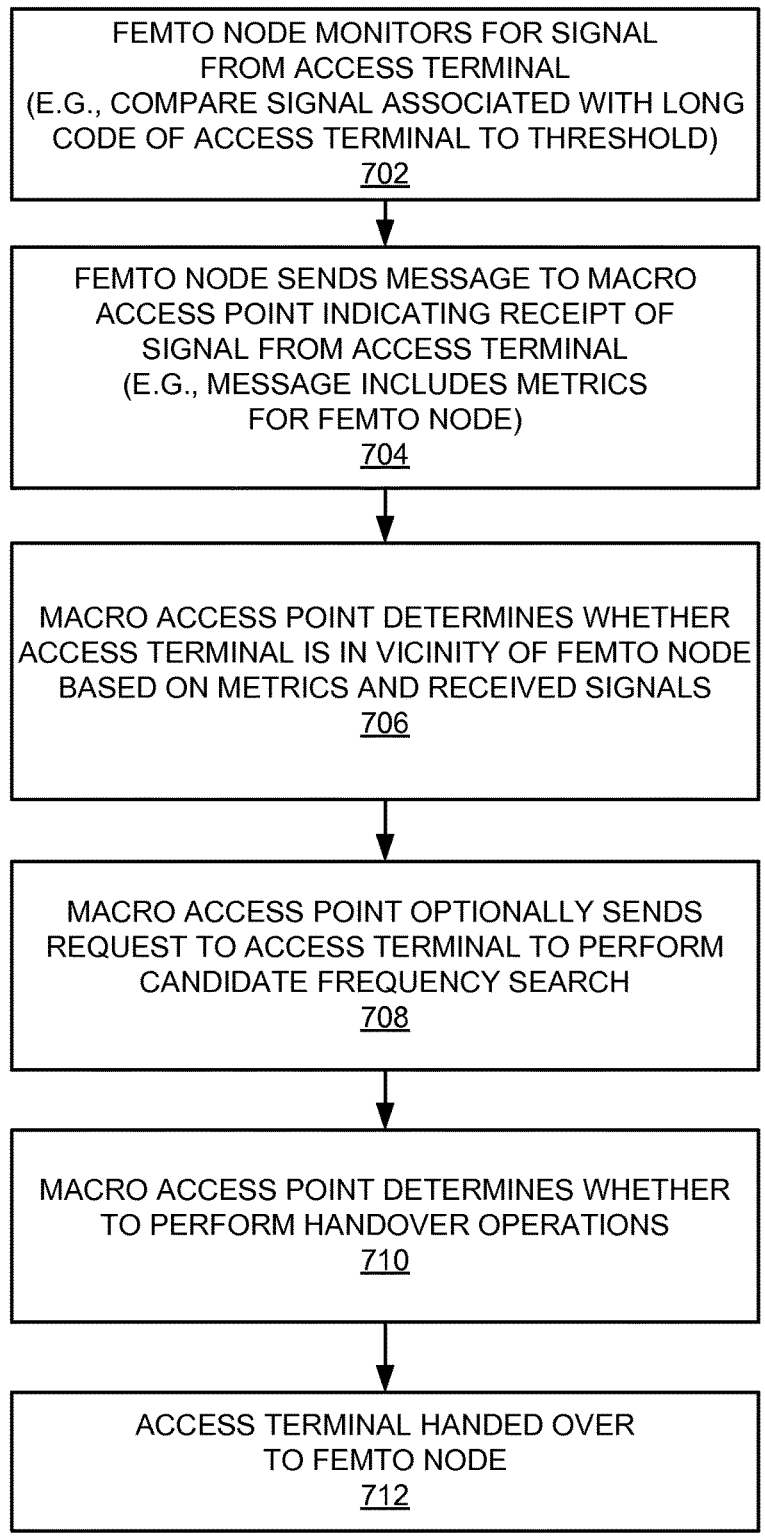
FIG. 7 is a flowchart of several sample aspects of operations where handover operations are invoked based on the relative vicinity of an access terminal and an access point.

In cases where a target access point initiates handover operations, additional procedures may be employed to help ensure that the handover will be successful. For example, as a precondition for conducting the handover, a determination may be made as to whether the access terminal is in the vicinity of the target access point and/or whether the access terminal is able to receive signals from the target access point. FIGS. 5 and 7 describe several operations that may be employed to provide a potentially more robust handover scheme such as this. In a similar manner as above, the operations of FIGS. 5 and 7 are described in the context of the nodes of FIG. 3 for illustration purposes.

As represented by block 502, the femto node 304 (e.g., the monitor 348) monitors for a signal from the access terminal 302. For example, the femto node 304 may sniff for signals on the reverse link of a macro channel looking for traffic associated with a long code (e.g., scattering code) of the access terminals that are expected to associate with the femto node 304.

As represented by block 504, in the event the femto node 304 detects a signal from the access terminal 302, the femto node 304 (e.g., the monitor 348) may continue to monitor for signals from the access terminal 302 in an attempt to verify that the access terminal is in the vicinity of the femto node 304. Here, the femto node 304 may monitor for messages transmitted by the access terminals whose long codes the femto node 304 knows and tracks.

In some cases, the femto node 304 monitors for pilot strength measurement messages transmitted by the access terminal 302 to the macro network. These pilot strength measurement messages indicate the received signal strength of macro network pilots as seen at the access terminal 302. The femto node 304 (e.g., the proximity determiner 340) may then compare these pilot strengths with similar metrics 346 maintained by the femto node 304.

Figure 6:
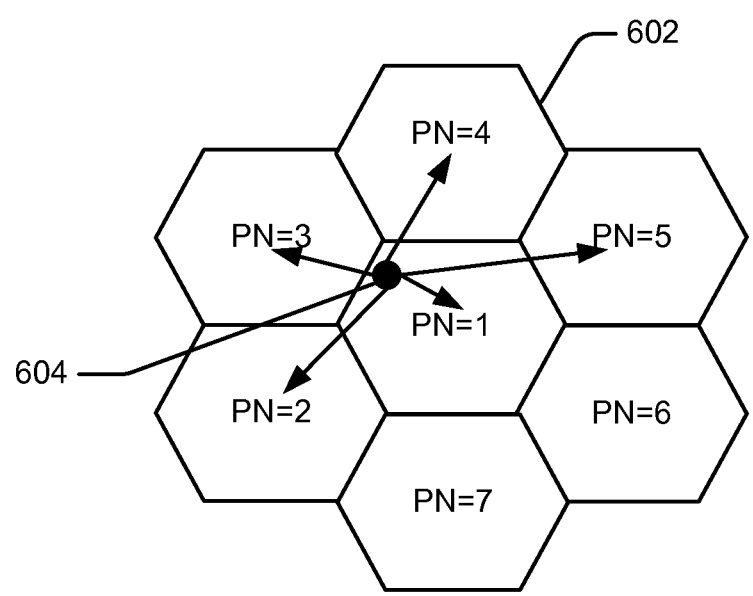
FIG. 6 is a simplified diagram illustrating sample vicinity vectors.

An example of such metrics will be described with reference to FIG. 6. Here, a series of macro coverage cells are represented by hexagons 602. The different cells are also indicated by the different PN sequence numbers (i.e., PN1-PN7). The location of the femto node 304 is represented by a symbol 604. The femto node 304 may be deployed on independent carrier from the macro network or on the same carrier. The arrows from the symbol 604 are indicative of the strengths and the RTDs of the different macro network neighbors as seen near the femto node 304 on a macro carrier.

In some aspects, femto vicinity may be defined based on the position of the deployed femto node 304 in relation to the macro network. For example, a set of vectors (e.g., triangulation vector information) based on information associated several macro pilots received at the femto node 304 or a GPS location of the femto node 304 may be used to define the femto vicinity. Here, the macro pilot information may comprise, for example, the macro pilot Ecp/Io as measured at the femto node 304 for each neighboring macro cell. In addition or alternatively, the macro pilot information may comprise information relating to the RTD between the femto node 304 and each neighboring macro cell.

Through the use of this femto vicinity, the femto node 304 and/or the macro network may determine whether the access terminal 302 is near the femto node 304. For example, in the event the macro pilot Ecp/Io vectors measured at the access terminal 302 are sufficiently similar to the macro pilot Ecp/Io vectors measured at the femto node 304, it may be determined at the access terminal 302 is in the vicinity of the femto node 304. Here, a particular vicinity of the femto node 304 may be defined, for example, as a specified deviation from the actual vectors of the femto node 304. In such a case, an access terminal 302 may be deemed to be in the vicinity of the femto node 304 if the vectors associated with the access terminal 302 fall within the specified deviation from the vectors of the femto node 304.

In some cases, at block 504 the femto node 304 may monitor for candidate frequency search reports transmitted by the access terminal 302 (e.g., by a candidate frequency search controller 350). Here, if the access terminal 302 is close enough to receive a signal (e.g., a pilot signal) from the femto node 304, the candidate frequency search report generated by the access terminal 302 may indicate that this signal was received and the corresponding signal strength. Thus, the femto node 304 may determine whether the access terminal 302 is in the vicinity of (e.g., within a coverage area of) the femto node 304 by acquiring and analyzing the candidate frequency search report generated by the access terminal 302. For example, this determination may be based on whether the Ecp/Io of the signal the access terminal 302 receives from the femto node 304 is greater than or equal to a threshold.

As represented by block 506, in the event it is determined that the access terminal 302 is in the vicinity of the femto node 304, the femto node 304 may send a message to the macro network to trigger handover-related operations. For example, in some cases this message may be a request to initiate a handover.

Alternatively, in some cases this message may be a request to invoke a candidate frequency search at the access terminal 302. In these cases, additional operations are performed to verify that the access terminal 302 is receiving signals from the femto node 304. Such a message may be directed, for example, to the macro access point 306 that is currently serving the access terminal 302.

As represented by block 508, the macro access point 306 will commence the appropriate handover-related operations upon receipt of the message sent at block 506. As mentioned above, in some cases this may simply involve the macro access point 306 (e.g., a handover controller 336) initiating a handover operation.

As mentioned above, in some cases the macro access point 306 (e.g., a candidate frequency search controller 352) may send a message to access terminal 302 to invoke a candidate frequency search at the access terminal 302. In response to this request, the access terminal 302 (e.g., the candidate frequency search controller 350) will conduct a search and send a report back to the macro access point 306. Based on this report, the macro access point 306 (e.g., handover controller 336) may determine whether to perform a handover.

As represented by block 510, in the event a handover is indicated, the macro access point 306, the femto node 304, and access terminal 302 may cooperate to perform the handover as discussed herein.

Referring now to FIG. 7, a scheme is described whereby a source access point may determine whether to proceed with a handover operation triggered by a target access point based on a determination of whether an access terminal is in the vicinity of the target access point. In some aspects, this scheme is based on vicinity metrics associated with the target access point.

As represented by block 702, the femto node 304 (e.g., the monitor 348) monitors for a signal from the access terminal 302. Here, the femto node 304 may dedicate channel elements on the reverse link of various macro channels to detect signals from the access terminal 302. For example, the femto node 304 may detect a signal associated with a long code of the access terminal 302 and then process the signal to determine whether the received signal strength is greater than or equal to a threshold.

As discussed herein, in some implementations only certain designated access terminals may be allowed access the femto node 304. In such a case, the femto node 304 may be configured to only monitor for these access terminals (e.g., based on the triggers discussed herein). Here, when the femto node 304 is scanning for specific access terminals, the femto node 304 may time multiplex looking for each specific access terminal over the different macro channels in the region, and potentially across multiple users.

Also, the femto node 304 may employ a wideband receiver for scanning multiple macro channels in the event these macro channels are contiguous. For example, the femto node may scan for specific access terminal long PN sequences across all the channels to see whether it is able to detect any energy from the access terminal. Advantageously, this technique may eliminate or reduce the need to hop through all of the macro channels one at a time for each specific access terminal. Alternatively, the femto node 304 may dedicate one scanning element per access terminal when scanning for the long PN sequences of the access terminals.

As represented by block 704, in the event such a signal is detected, the femto node 304 may send a message to the macro access point 306 that indicates that such a signal was received. In addition, the femto node 304 may send one or more metrics to the macro access point 306 (e.g., in the same message or a different message). Here, the metric information may be sent to the macro access point 306 at times when the macro access point 306 will use the information. Advantageously, the macro access point 306 need not maintain the metric information of all of the femto nodes in its coverage area (e.g., which may be a relatively large number of femto nodes) for use in handover operations.

As represented by block 706, the receipt of the message from the femto node 304 triggers handover-related operations at the macro access point 306. In particular, the macro access point 306 (e.g., the proximity determiner 342) will determine whether the access terminal 302 is in the vicinity of the femto node 304 based on the received metric information and information the macro access point 306 acquires relating to the location of the access terminal 302.

As discussed above, in some cases the metrics may relate to pilot signal strength measurements. The macro access point 306 may receive pilot strength measurement messages from the access terminal 302 that indicate the pilot signal strength associated with signals the access terminal 302 receives from neighboring macro access points. In this case, the macro access point 306 may compare these metrics with corresponding pilot signal strength metrics received from the access terminal 302 to determine whether the access terminal 302 is in the vicinity of the femto node 304. In various implementations, access terminal 302 may send the pilot strength measurement messages periodically or in response to a request by the macro access point 306.

In some cases the metrics may relate to RTD. For example, the macro access point 306 may determine the RTD values from the access terminal 302 to several macro access points that are neighbors of the access terminal 302. The macro access point 306 may then compare these metrics with corresponding RTD metrics received from the femto node 304 to determine whether the access terminal 302 is in the vicinity of the femto node 304. For example, the pilot strength measurement report messages may include phase information that relates the phase for a given macro pilot to the phase of a reference pilot. Given the RTD to the reference pilot, the RTD to the other pilots may then be calculated. This RTD information may then be compared with the RTD metrics received from the femto node 304.

It in some cases the metrics may relate to GPS information. For example, the macro access point may force the active set of the access terminal 302 to include at least three macro base stations. The macro access point 306 may thereby triangulate the location of the access terminal based on the macro pilots the access terminal 302 receives from these base stations. The macro access point 306 may then compare this location information with the GPS information provided by the femto node 304.

As represented by block 708, in the event the macro access point 306 determines that the access terminal 302 is in the vicinity of the femto node 304, the macro access point 306 (e.g., the candidate frequency search controller 352) may send a request to the access terminal 302 to conduct a candidate frequency search. In this way, the macro access point 306 may further verify that the access terminal 302 is in the coverage area of the femto node 304.

As represented by block 710, the macro access point 306 (e.g., the handover controller 336) may determine whether to perform a handover based on the above. The access terminal 302 may then be handed over to the femto node 304 in the event a handover is indicated.

Figure 8:
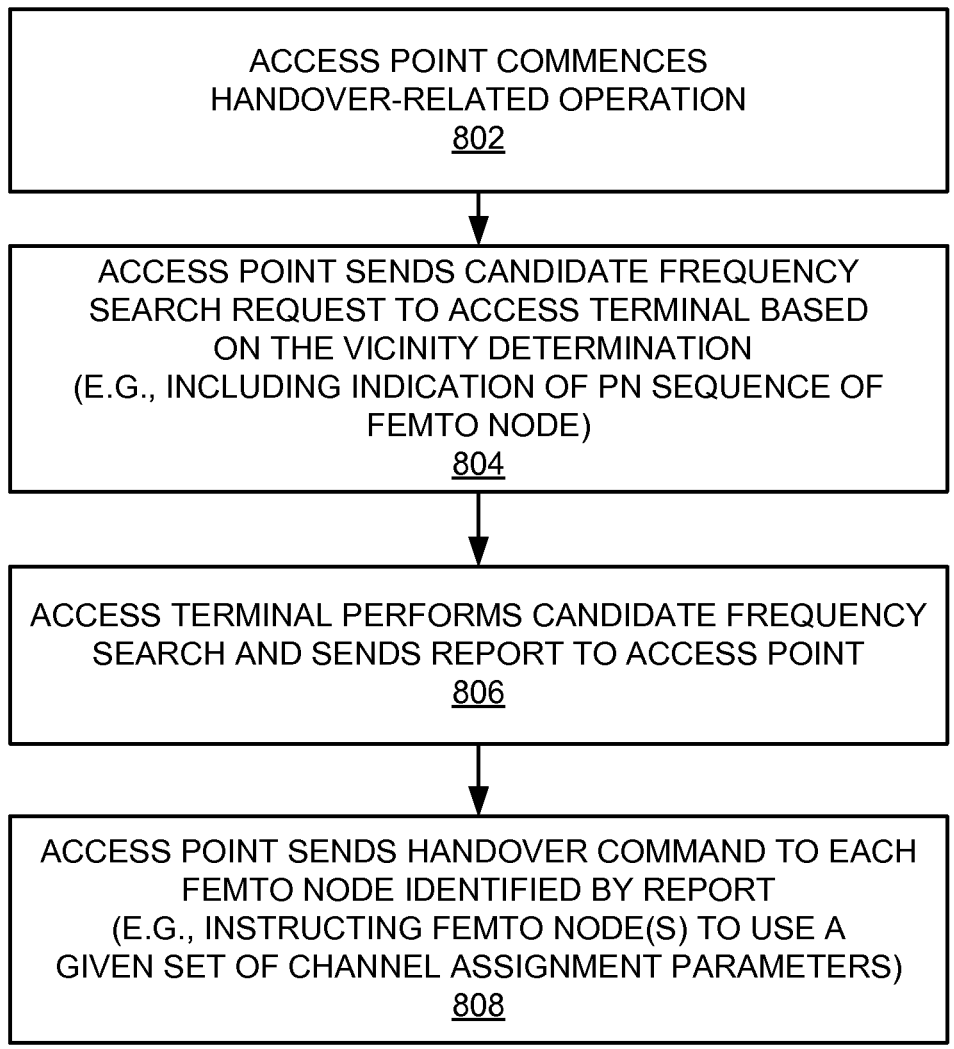
FIG. 8 is a flowchart of several sample aspects of handover operations where there is potential ambiguity regarding the target access point.

Referring now to FIG. 8, under certain conditions confusion may arise regarding which access point of a set of neighboring access point is the intended target access point. For example, in a case where a large number of femto nodes are employed, the identifiers used by these femto nodes may be reused such that more than one femto node may use the same identifier. As an example, more than one femto node may use the same pseudorandom noise ("PN") sequence in a given area. FIG. 8 describes a scheme that may be used to perform a handover under such circumstances. Again, these operations will be described with reference to FIG. 3.

As represented by block 802, at some point in time the macro access point 306 commences handover related operations as discussed herein. For example, the macro access point 306 or a target access point may identify an access terminal to be handed over to the target access point.

As represented by block 804, the macro access point 306 may send a candidate frequency search request to the access terminal 302 as discussed herein. In some implementations, this request may include an identifier of the target access point (e.g., the PN sequence used by the femto node 304).

As represented by block 806, the access terminal 302 performs the requested candidate frequency search and sends a report back to the macro access point 306. Here, the report may identify, for example, the pilot signals (e.g., the PN sequences) that were received by the access terminal 302. As mentioned above, in some cases this report may indicate that multiple femto nodes are using the same PN sequence.

As resented by block 808, upon receiving a candidate frequency search report that indicates that there is ambiguity concerning the target access point, the macro access point 306 (e.g., a handover controller 336) may elect to send a handover command to each of the femto nodes identified by the candidate frequency search report. For example, the macro access point 306 may send the same set of channel assign parameters to each of the identified femto nodes. In this way, when the access terminal 302 is redirected to a target femto node, whichever femto node the access terminal 302 ends up communicating with will have the appropriate information. The other femto nodes will then eventually abort their handover operations.

In some implementations an access terminal may initiate handover-related operations. For example, an access terminal may maintain information indicative of the identity of an associated femto node and perform on-frequency and off-frequency scans to locate the femto node. Once the femto node is located, the access terminal may provide a femto identifier (e.g., the access terminal may maintain an IP address or some other identifier that a macro access point may use to communicate with the femto node). The macro access point may then use this information to established communication with the femto node to hand over the access terminal to the femto node.

Figure 9:
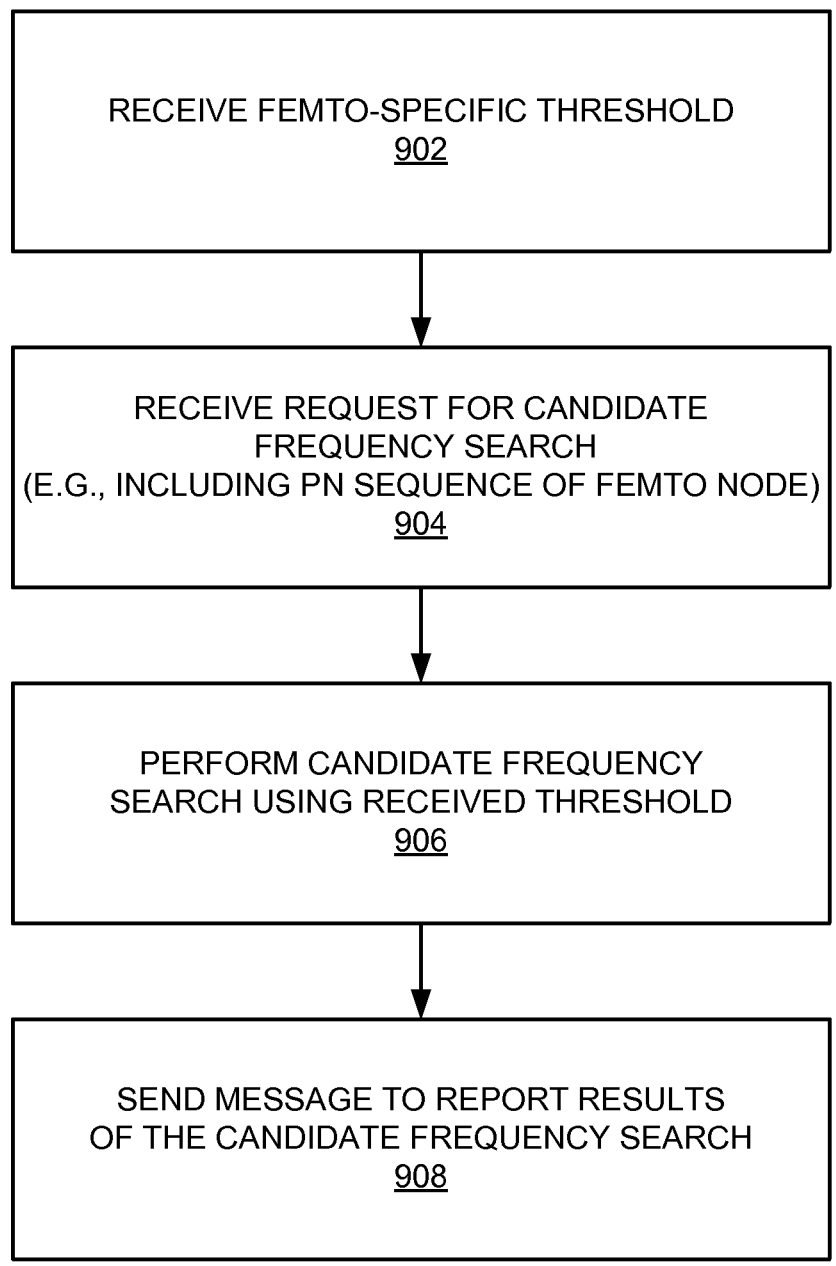
FIG. 9 is a flowchart of several sample aspects of access terminal-assisted handover operations

Referring now to FIG. 9, in some cases a femto-specific threshold may be specified for use by the access terminal. These operations also will be described with reference to FIG. 3.

As represented by block 902, the access terminal 302 may receive a femto-specific threshold (e.g., from a network node such as a mobility manager or from a macro access point). In some cases, this threshold may be specified for a particular femto node (e.g., the femto node 304). In some cases this threshold may be specified for a set of femto nodes (e.g., all or a portion of the femto nodes deployed in a network). Thus, a different threshold may be used to detect a signal from a femto node than is used to detect a signal from a macro access point.

As represented by block 904, the access terminal 302 may optionally receive a request to perform a candidate frequency search report. Here, the request may include an identifier (e.g., PN sequence) of a target femto node associated with a particular femto-specific threshold.

As represented by block 906, the access terminal 302 performs the candidate frequency search for a signal from the target femto node using the designated threshold. The access terminal 302 then reports the results of the search at block 908 to trigger handover operations at the source macro access point.

The teachings herein also may be applicable to implementations where the macro network initiates handover operations. For example, the macro network may maintain information regarding the locations of the deployed femto nodes (e.g., the vicinity metrics described herein) and also track the current locations of access terminals that are active in the network (e.g., currently in-call). In the event the macro network determines that an access terminal is in the vicinity of a desired target femto node, the macro network may request the access terminal to perform a candidate frequency search. As discussed herein, based on the results of the search, the macro network may handover the access terminal to the target femto node.

In addition, as discussed herein an access terminal may send pilot strength measurement reports to the macro network and the macro network uses these reports to determine whether the access terminal is in the vicinity of a target femto node. Here, the access terminal may send its reports periodically or upon the detection of beacons transmitted on the macro carriers by the deployed femto nodes.

Also, the macro network may use RTD measurements either independently or in addition to the pilot strength measurement messages to determine whether an access terminal is in the vicinity of a target femto node as discussed herein.

In implementations where the femto nodes in a network are not restricted (e.g., as described herein), the macro network (e.g., the source macro access point) may be configured with information regarding the reaches of the network where the unrestricted femto nodes are deployed. In this way, the macro network may more effectively support a handover to these femto nodes.

For example, when an access terminal enters a region where unrestricted femto nodes are deployed, the macro network may initiate a candidate frequency search of designated femto channels to obtain a report of the femto node PN sequences that the access terminal is able to hear. In some implementations the macro network may trigger this candidate frequency search based on the location of the access terminal. In some implementations the macro network may trigger this candidate frequency search throughout a given sector (e.g., a sector in which it is known that unrestricted femto cells are deployed). Alternatively, the femto node may transmit a beacon in the macro channel, whereby the access terminal may automatically report receipt of this beacon as it enters the femto region (e.g., a report is sent when the signal strength of the femto beacon exceeds a threshold).

As discussed above, the macro network may maintain information for the femto nodes in a network. This information may include the region where the femto node is deployed and other information such as, for example, the PN sequence information for the femto node. Based on the PN sequence information reported by the access terminal, the macro network may identify the subset of femto nodes that have the reported PN sequence. The macro network then sends a trigger to this subset of femto nodes with the mobile specific information, triggering the femto nodes to perform a handover procedure, as applicable.

With the above in mind, sample handover call flow operations and components that may be employed in accordance with the teachings herein will be described in more detail with reference to FIGS. 10-16.

Figure 10:
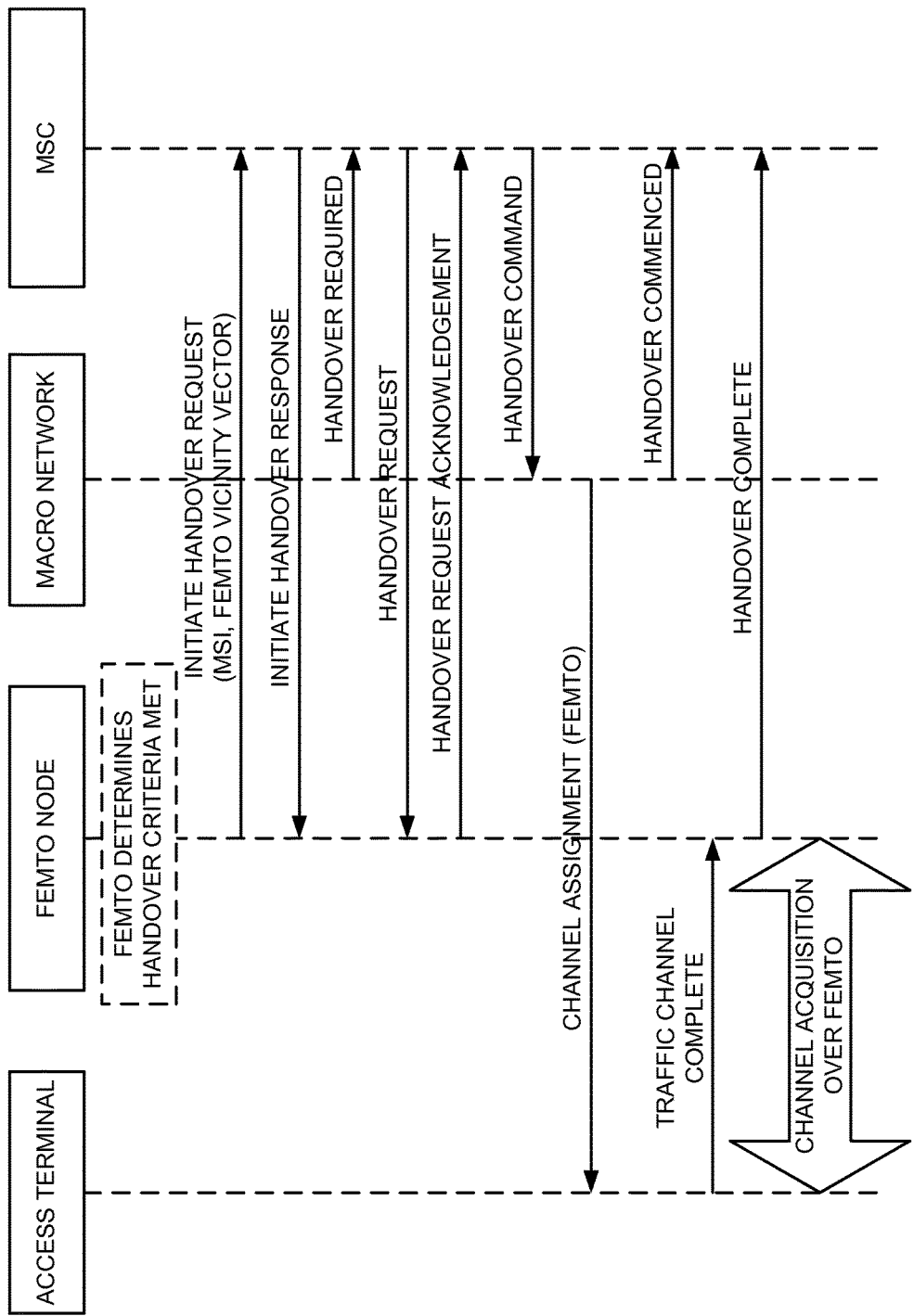
FIG. 10 is a simplified diagram illustrating sample handover call flow operations.

FIG. 10 illustrates sample call flow procedures that may be employed in conjunction with a target initiated handover. Here, the femto node autonomously determines that an active call is to be handed over to the femto node, allocates the required channel resources, and initiates the handover procedures at the femto node.

Initially, the femto node determines that the handover criteria is met and can be supported. The femto node then sends an initiate handover request to the macro network. This request may include an identifier of the access terminal (e.g., IMSI) as well as femto vicinity information as discussed herein.

A macro network acknowledges the handover initiation with an appropriate response and subsequently maintains the information. The macro network may then trigger looking for the femto node when the access terminal enters the femto vicinity. Once the decision is made, the macro network sends a handover required message to a mobile switching center ("MSC") network node.

Based on the target system information, the MSC sends a handover request to the femto node. The femto node allocates the channel resources and provides information to the MSC via a handover request acknowledgment message.

The MSC forwards the information to the macro network via a handover command.

The source macro network forwards the channel assignment to the access terminal. Here, a return on failure flag may be set, implying that the channel resources in the macro network are retained for the access terminal to return to the macro network in the event acquisition of the femto node fails.

The macro network sends a handover commenced message to the MSC to indicate that the channel assignment has been sent to the access terminal.

The femto node acquires the access terminal and sends an acknowledgment to the access terminal. The access terminal acquires the forward link and sends a traffic channel complete message to the femto node.

Once the traffic channel complete message is received, the femto node sends a handover complete message to the MSC. The handover procedure is thus completed and the call is established over the femto node.

Figure 11:
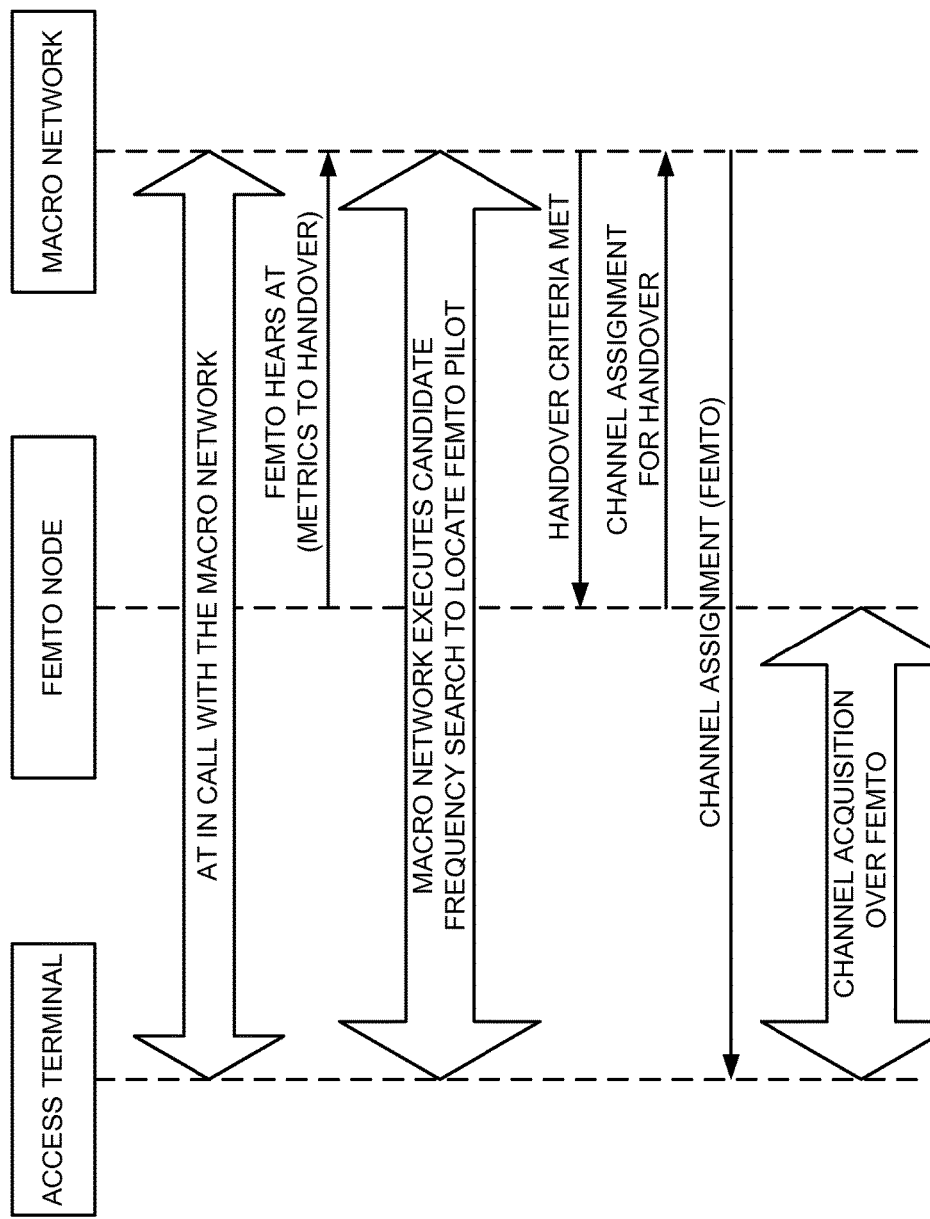
FIG. 11 is a simplified diagram illustrating sample handover call flow operations.

FIG. 11 describes sample call flow for an implementation where the macro network determines whether to perform a handover based on metrics received from a femto node.

Initially, an access terminal ("AT") is in an active connection with the macro network with an active set assignment of one or more sectors.

As discussed above, the femto node may listen for specific access terminals. Once it detects an access terminal, the femto node triggers the macro network to initiate procedures for potential handover to this femto node (e.g., via the "femto hears AT" message). The femto node maintains information regarding when an active call handover procedure may be successful. As discussed above this information may comprise trigger conditions that identify the location of the access terminal in the mobile network that may result in a successful handover to the femto node. For example, this information may include measured Ecp/Io values of the different PN sequences of the nodes in the neighborhood of the femto node, and the RTDs experienced with the different PN sequences.

The femto node, apart from listening for traffic from the access terminal, may decode pilot strength measurement messages (that the access terminal sent to the macro network) to determine how strongly the access terminal receives the pilot signal from the femto node. This may be accomplished, for example, by the macro network instructing the access terminal to send periodic pilot strength measurement messages.

Next, if the femto node is not transmitting beacons on the macro channels, the macro network requests the mobile to perform a candidate frequency search to locate the femto node and report signal strength and associated PN information. Here, the handover may be performed only to a specific femto node with the identified PN.

As mentioned above, in some cases another femto node may use the same PN. However, the access terminal's long PN code is unique. The target femto node will scan for the access terminal using a known long PN and can determine when to initiate a handover. In some aspects, a determination of when to initiate a handover may be based on knowledge of the macro transmitted Ecp and the receive Ecp/Io at the boundary of the femto node. In some aspects, a determination of when to initiate a handover may be based on how close an access terminal is to a downlink boundary. Here, such a determination may be facilitated if the macro access point provides access terminal Ecp/Nt and pilot strength measurement messages to the femto node.

When an access terminal reports a pilot based on scans of a femto channel (e.g., a channel dedicated to femto nodes), the access terminal may find pilots without specific knowledge of which femto node sent a pilot in cases where there is pilot reuse within the region. The macro network may thus encounter a miss-detect. Here, detection may be facilitated through the use of the RTD and the Ecp/Io of the macro access points when the scans for femto nodes are triggered for active call handovers.

The Ecp/Io of the macro access points also may be used to determine a handover boundary. For example, if the femto node beacon transmit power and the reverse link pad are chosen for link balance (or if the link is not balanced but the imbalance is known), the receive Ecp from the access terminal at the femto node may be used to determine the handover boundary.

This Ecp/Io also may be used along with the RTD at the macro access point to determine the handover boundary.

The macro network may force an active set for the access terminal on the macro network to detect the exact location of the access terminal and identify the trigger conditions for the handover as identified by a specific femto node. As discussed above, the femto node may provide the femto vicinity information to the macro network. This information may be in the form of the RTD, the Ecp, and the Ecp/Io of the different macro access points (different PNs). Given this, the macro access point may set the active set pilots to match the pilots identified by the femto node's femto vicinity so that the macro access point may detect whether the access terminal is in the vicinity of the femto node.

These procedures may be executed several times (e.g., with some back off) to enable the macro network to detect when the access terminal enters the femto vicinity.

Referring again to FIG. 11, once the handover criteria are met, the macro network provides a trigger to the target femto node.

The femto node then allocates the traffic channel and provides the channel assignment information for the handover to the macro network.

Next, the macro network sends the handover message to the access terminal to trigger the access terminal to handover to the femto node. Here, the macro network may send a handover command with a return on failure indication. This trigger to the access terminal also may be used to send a command to the access terminal while the access terminal is in the macro network to perform an off-frequency scan and report the femto node PN. In this way, additional assurance that the handover may succeed may be obtained.

The access terminal then establishes a connection over the femto node. As mentioned above, if this handover procedure fails, the access terminal may return to the macro network to the previous traffic channel.

Figure 12:
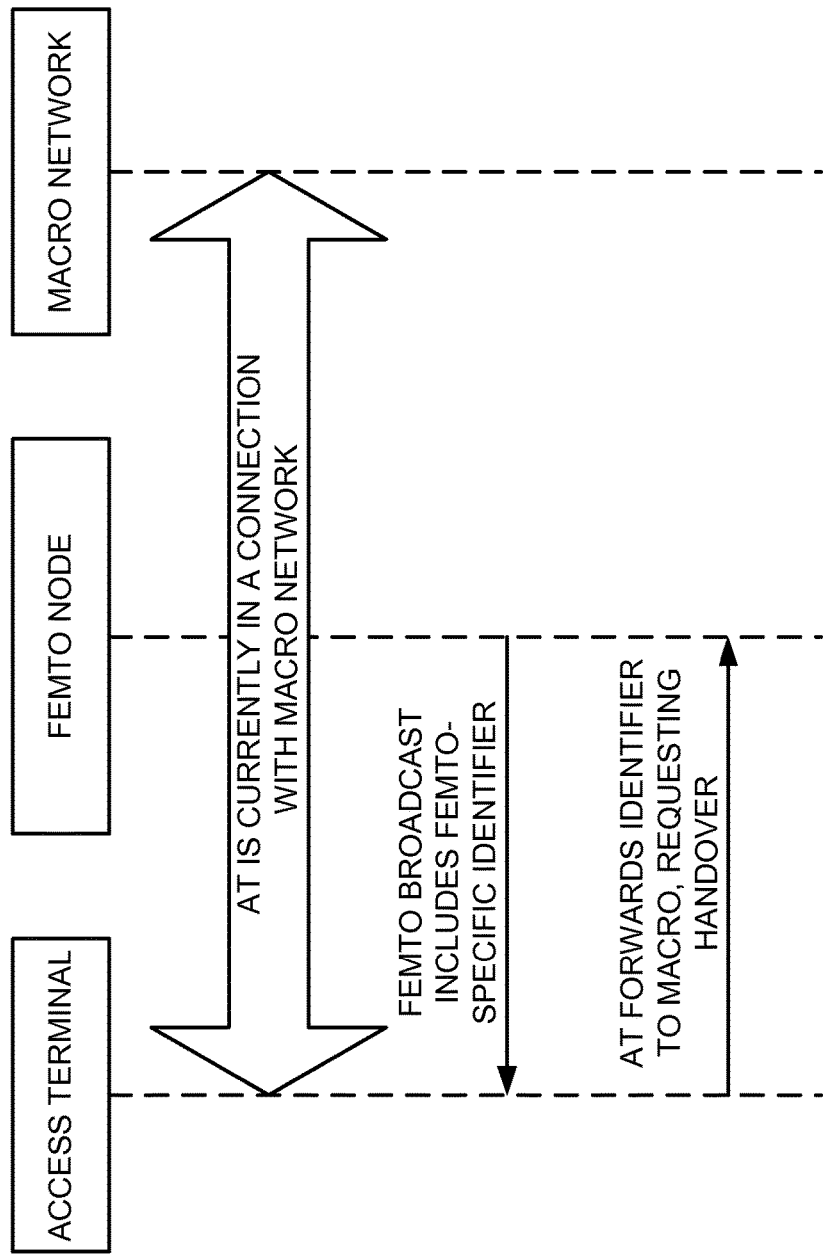
FIG. 12 is a simplified diagram illustrating sample handover call flow operations.

FIG. 12 describes a sample call flow scenario where an access terminal collects information from the femto node and forwards the information to the macro network to trigger a handover. Here, the access terminal may maintain femto vicinity information and scan the channel used by the femto node (e.g., a dedicated femto channel) to locate the femto node. As this may result in small outages in the macro channel operation, provisions may be made to avoid power levels from being increased arbitrarily during these outage periods. Once the femto node is located, the access terminal sends a request to perform a handover to the macro network.

In some cases this may involve the access terminal monitoring a channel (e.g., a sync channel) to obtain a femto-specific identifier. To this end, the femto node may transmit an explicit unique identifier over-the-air which the access terminal may acquire during its scan. The access terminal forwards this identifier to the macro network so that the macro network may identify the femto node for the handover operation.

When an access terminal is acquired on the femto node, the access terminal may perform an off-frequency scan of the macro network to record the femto's vicinity in the macro network. This information may be retained for subsequent triggering of the scans for the femto node. In some implementations, the access terminal may be configured in a relatively conservative manner to enable a wide range of macro pilot strengths to be used in initiating an off-frequency scan to locate the femto node. Information regarding the femto vicinity may be combined with a telescopic femto node scan event to avoid frequent scans and optimize battery life of the access terminal. For example, an access terminal may initially monitor macro pilot signals to determine whether the access terminal is close to the femto node. Once it determines that it is close to the femto node, the access terminal scans for signals from the femto node (e.g., PN sequence, femto identifier).

Referring now to the call flow of FIG. 12, initially the access terminal is associated with the macro network. As mentioned above the access terminal maintains femto vicinity information. Based on the femto vicinity information, the access terminal may initiate an off-frequency scan looking for the femto node.

As discussed above, the femto node broadcasts femto specific information (e.g., in a sync channel). The access terminal reads the sync channel during its off-frequency scan and obtains the femto specific information (e.g., when the signal level is above a threshold). Here, the access terminal may restrict its search to the femto PNs with which the access terminal expects to associate (e.g., the PNs associated with home femto nodes). The access terminal may make several measurements spaced in time and calculate pilot strength based on these measurements (e.g., a linear average value).

Finally, the trigger to initiate the handover to the femto node is sent to the macro network. The macro network translates the femto specific identifier to the femto node and initiates the handover procedure.

In some implementations, instead of using an existing sync channel, an independent Walsh code may be allocated to provide a quick cell identifier channel function. Such a channel may be synchronous with the pilot channel and provide the cell identifier to the access terminal.

Figure 13:
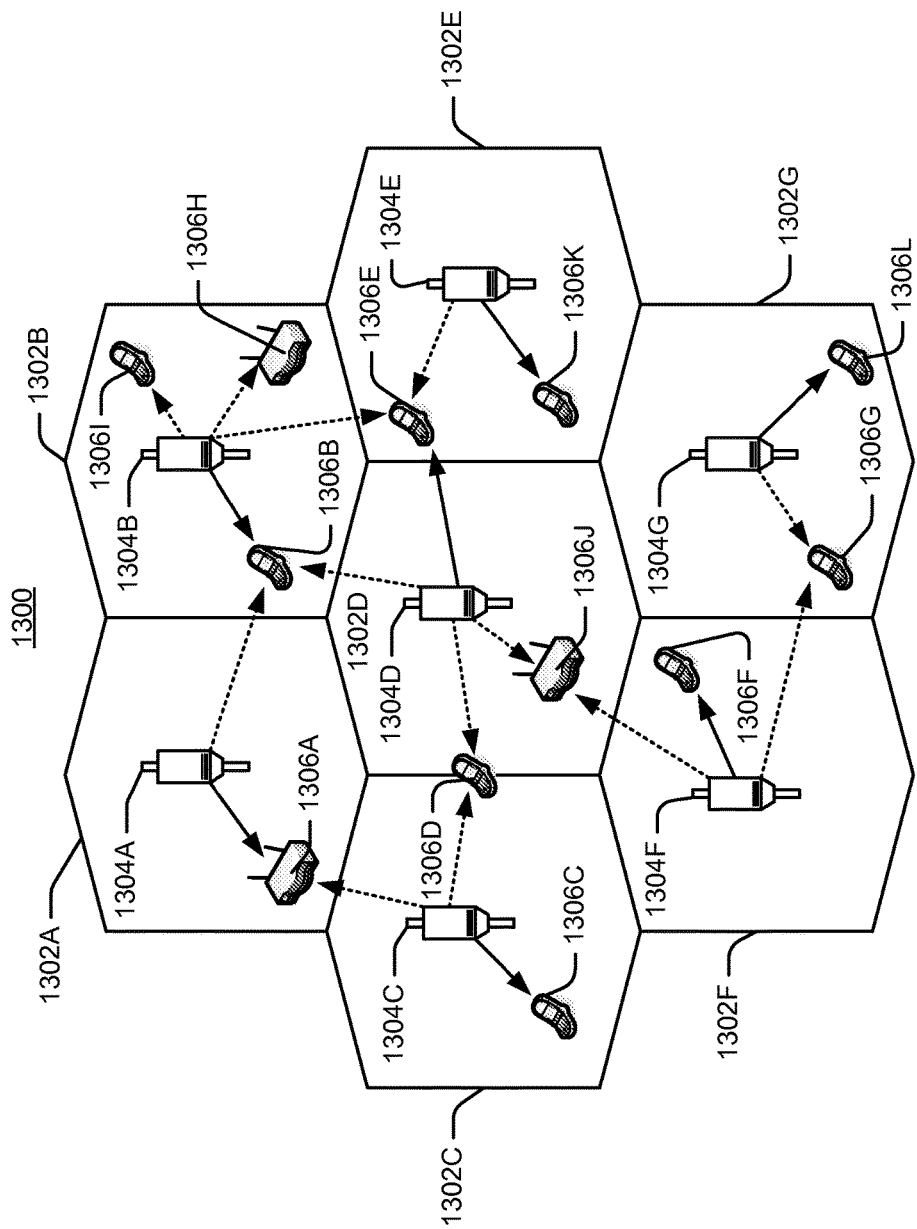
FIG. 13 is a simplified diagram of a wireless communication system.
Figure 14:
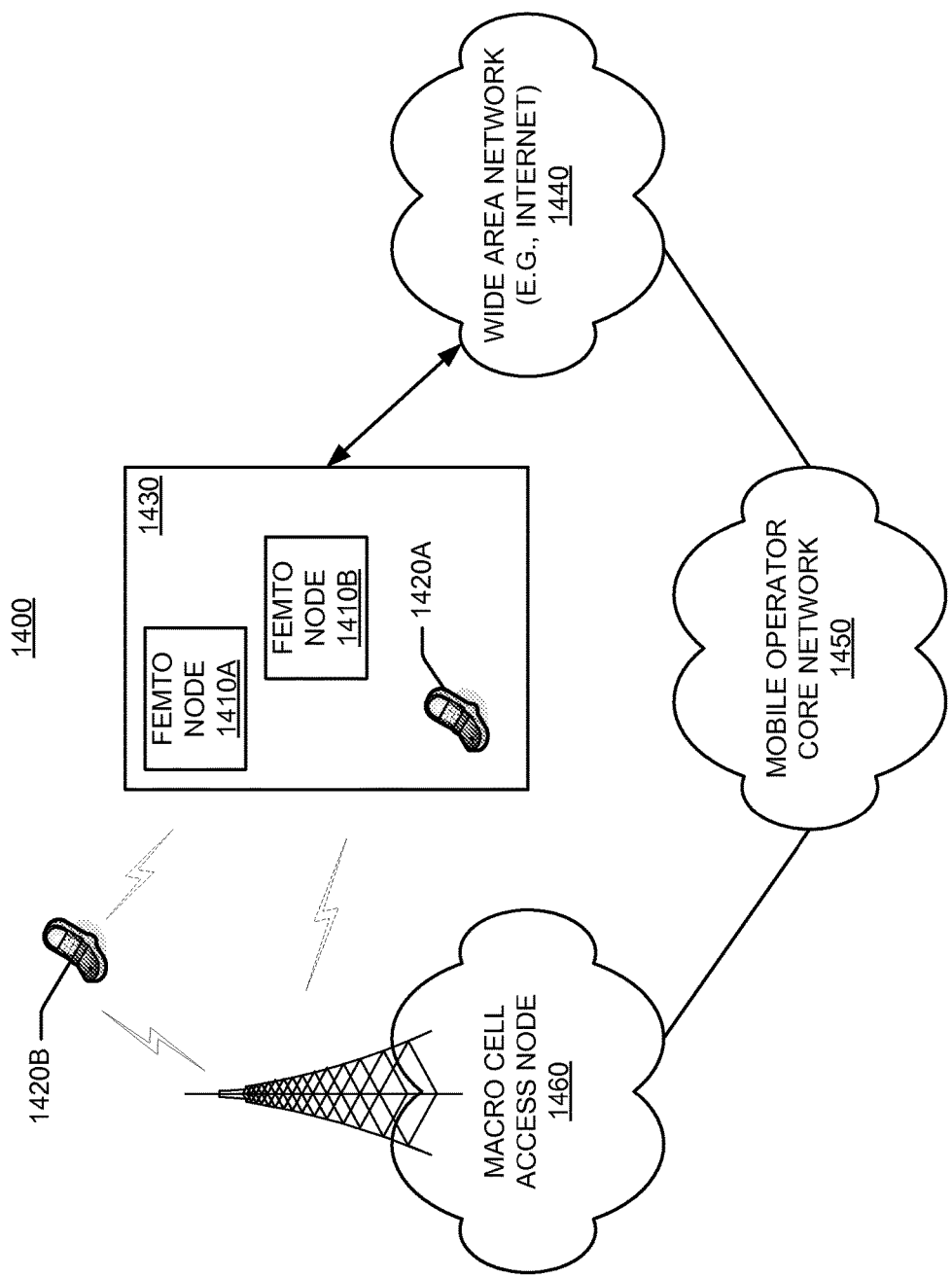
FIG. 14 is a simplified diagram of a wireless communication system including femto nodes.

As mentioned above, the teaching herein may be implemented in network that employs macro access points, femto nodes, relay nodes, and so on. FIGS. 13 and 14 illustrate examples how access points may be deployed in such a network. FIG. 13 illustrates, in a simplified manner, how the cells 1302 (e.g., macro cells 1302A-1302G) of a wireless communication system 1300 may serviced by corresponding access points 1304 (e.g., access points 1304A-1304G). Here, the macro cells 1302 may correspond to the macro coverage areas 204 of FIG. 2. As shown in FIG. 13, access terminals 1306 (e.g., access terminals 1306A-1306L) may be dispersed at various locations throughout the system over time. Each access terminal 1306 may communicate with one or more access points 1304 on a forward link ("FL") and/or a reverse link ("RL") at a given moment, depending upon whether the access terminal 1306 is active and whether it is in soft handover, for example. Through the use of this cellular scheme, the wireless communication system 1300 may provide service over a large geographic region. For example, each of the macro cells 1302A-1302G may cover a few blocks in a neighborhood or several square miles in rural environment.

FIG. 14 illustrates an example how one or more femto nodes may be deployed within a network environment (e.g., the system 1300). In the system 1400 of FIG. 14, multiple femto nodes 1410 (e.g., femto nodes 1410A and 1410B) are installed in a relatively small area coverage network environment (e.g., in one or more user residences 1430). Each femto node 1410 may be coupled to a wide area network 1440 (e.g., the Internet) and a mobile operator core network 1450 (e.g., comprising network nodes as discussed herein) via a DSL router, a cable modem, a wireless link, or other connectivity means (not shown).

The owner of a femto node 1410 may subscribe to mobile service, such as, for example, 3G mobile service offered through the mobile operator core network 1450. In addition, an access terminal 1420 may be capable of operating both in macro environments and in smaller area coverage (e.g., residential) network environments. In other words, depending on the current location of the access terminal 1420, the access terminal 1420 may be served by a macro cell access point 1460 associated with the mobile operator core network 1450 or by any one of a set of femto nodes 1410 (e.g., the femto nodes 1410A and 1410B that reside within a corresponding user residence 1430). For example, when a subscriber is outside his home, the subscriber may be served by a standard macro access point (e.g., access point 1460) and when the subscriber is near or inside his home, the subscriber may be served by a femto node (e.g., node 1410A). Here, a femto node 1410 may be backward compatible with legacy access terminals 1420.

A femto node 1410 may be deployed on a single frequency or, in the alternative, on multiple frequencies. Depending on the particular configuration, the single frequency or one or more of the multiple frequencies may overlap with one or more frequencies used by a macro access point (e.g., access point 1460).

In some aspects, an access terminal 1420 may be configured to connect to a preferred femto node (e.g., the home femto node of the access terminal 1420) whenever such connectivity is possible. For example, whenever the access terminal 1420A is within the user's residence 1430, it may be desired that the access terminal 1420A communicate only with the home femto node 1410A or 1410B.

In some aspects, if the access terminal 1420 operates within the macro cellular network 1450 but is not residing on its most preferred network (e.g., as defined in a preferred roaming list), the access terminal 1420 may continue to search for the most preferred network (e.g., the preferred femto node 1410) using a Better System Reselection ("BSR"), which may involve a periodic scanning of available systems to determine whether better systems are currently available, and subsequent efforts to associate with such preferred systems. With the acquisition entry, the access terminal 1420 may limit the search for specific band and channel. For example, the search for the most preferred system may be repeated periodically. Upon discovery of a preferred femto node 1410, the access terminal 1420 selects the femto node 1410 for camping within its coverage area.

A femto node may be restricted in some aspects. For example, a given femto node may only provide certain services to certain access terminals. In deployments with so-called restricted (or closed) association, a given access terminal may only be served by the macro cell mobile network and a defined set of femto nodes (e.g., the femto nodes 1410 that reside within the corresponding user residence 1430). In some implementations, a node may be restricted to not provide, for at least one node, at least one of: signaling, data access, registration, paging, or service.

In some aspects, a restricted femto node (which may also be referred to as a Closed Subscriber Group Home NodeB) is one that provides service to a restricted provisioned set of access terminals. This set may be temporarily or permanently extended as necessary. In some aspects, a Closed Subscriber Group ("CSG") may be defined as the set of access points (e.g., femto nodes) that share a common access control list of access terminals. A channel on which all femto nodes (or all restricted femto nodes) in a region operate may be referred to as a femto channel.

Various relationships may thus exist between a given femto node and a given access terminal. For example, from the perspective of an access terminal, an open femto node may refer to a femto node with no restricted association (e.g., the femto node allows access to any access terminal). A restricted femto node may refer to a femto node that is restricted in some manner (e.g., restricted for association and/or registration). A home femto node may refer to a femto node on which the access terminal is authorized to access and operate on (e.g., permanent access is provided for a defined set of one or more access terminals). A guest femto node may refer to a femto node on which an access terminal is temporarily authorized to access or operate on. An alien femto node may refer to a femto node on which the access terminal is not authorized to access or operate on, except for perhaps emergency situations (e.g., 911 calls).

From a restricted femto node perspective, a home access terminal may refer to an access terminal that is authorized to access the restricted femto node (e.g., the access terminal has permanent access to the femto node). A guest access terminal may refer to an access terminal with temporary access to the restricted femto node (e.g., limited based on deadline, time of use, bytes, connection count, or some other criterion or criteria). An alien access terminal may refer to an access terminal that does not have permission to access the restricted femto node, except for perhaps emergency situations, for example, such as 911 calls (e.g., an access terminal that does not have the credentials or permission to register with the restricted femto node).

For convenience, the disclosure herein describes various functionality in the context of a femto node. It should be appreciated, however, that a pico node or relay node may provide the same or similar functionality for a different (e.g., larger) coverage area. For example, a pico node or a relay node may be restricted, a home pico node or home relay node may be defined for a given access terminal, and so on.

Figure 15:
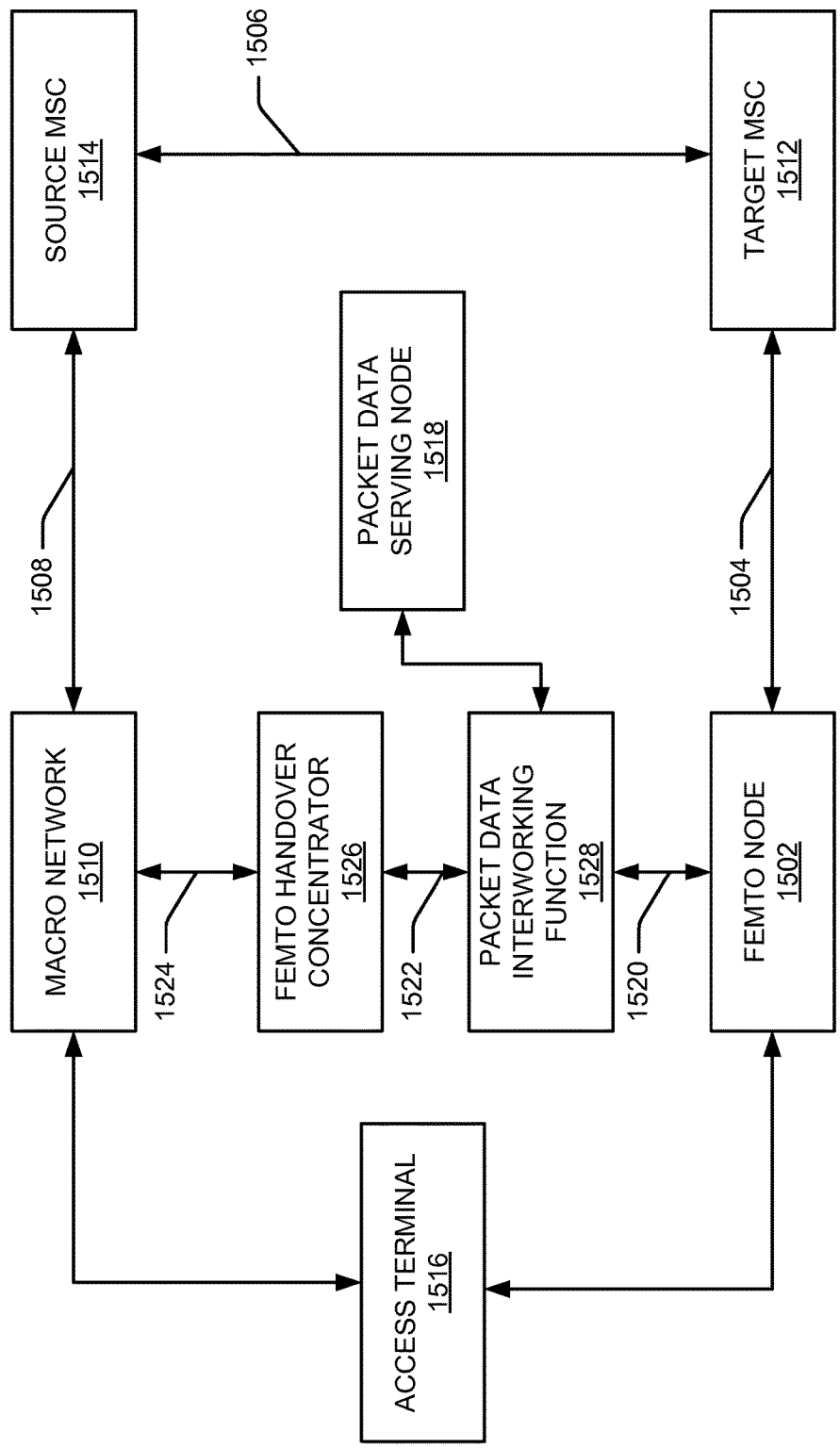
FIG. 15 is a simplified diagram of a wireless communication system illustrating sample techniques for establishing communication between source and target access points.

Referring to FIG. 15, two sample schemes for supporting handover to a femto node as taught herein will be described. In a first scheme, an existing interface to the mobile switching center ("MSC") may be configured to support additional messaging that may be used to enable a femto node 1502 to communicate target initiated trigger events. For example, the interfaces indicated by the lines 1504, 1506, and 1508 may be configured to support communication between the femto node 1502 and a macro network 1510 via a target MSC 1512 in a source MSC 1514. Here, conventional interfaces may be employed to an access terminal 1516 and a packet data serving node 1518.

In a second scheme, an interface as indicated by other lines 1520, 1522, and 1524 may be provided to communicate the handover initiation and trigger conditions from the femto node 1502 to the macro network 1510. Here, a femto handover concentrator 1526 may be employed to receive the handover initiation from the femto node 1502 (e.g., via a packet data interworking function 1528) and identify the macro network 1510 currently supporting the active call for the access terminal 1516. The femto handover concentrator 1526 may command the macro network 1510 to start initiating a handover procedure. The macro network 1510 may then query the femto handover concentrator 1526 for the handover triggers and verify if the trigger conditions are met and also coordinate the information regarding which femto node is the target for the handover.

The teachings herein may be implemented in various types of communication devices. In some aspects, the teachings herein may be implemented in wireless devices that may be deployed in a multiple access communication system that may simultaneously support communication for multiple wireless access terminals. Here, each terminal may communicate with one or more access points via transmissions on the forward and reverse links. The forward link (also known as the downlink) refers to the communication link from the access points to the terminals, and the reverse link (also known as the uplink) refers to the communication link from the terminals to the access points. This communication link may be established via a single-in-single-out system, a multiple-in-multiple-out ("MIMO") system, or some other type of system.

Figure 16:
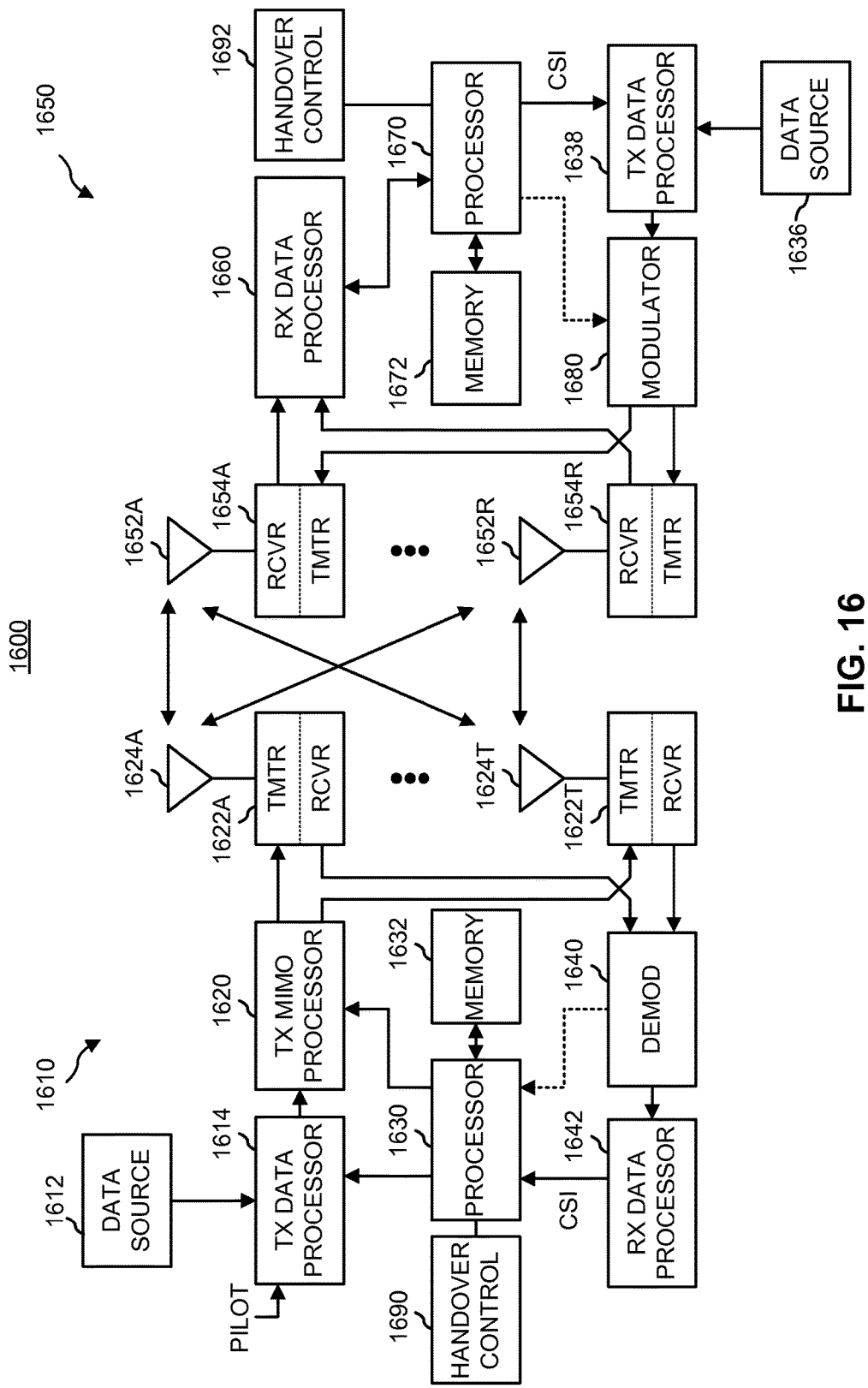
FIG. 16 is a simplified block diagram of several sample aspects of communication components.
Figure 17:
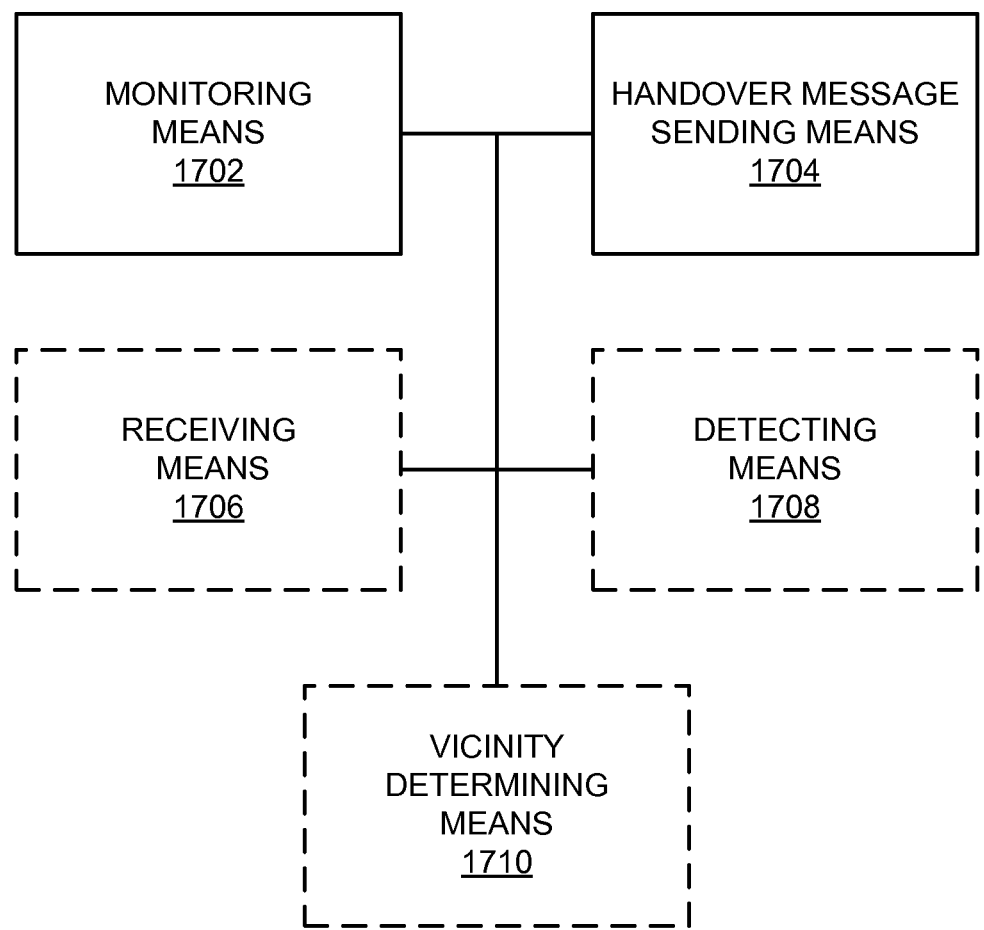
FIGS. 17-20 are simplified block diagrams of several sample aspects of apparatuses configured to perform handover-related operations as taught herein.
Figure 18:
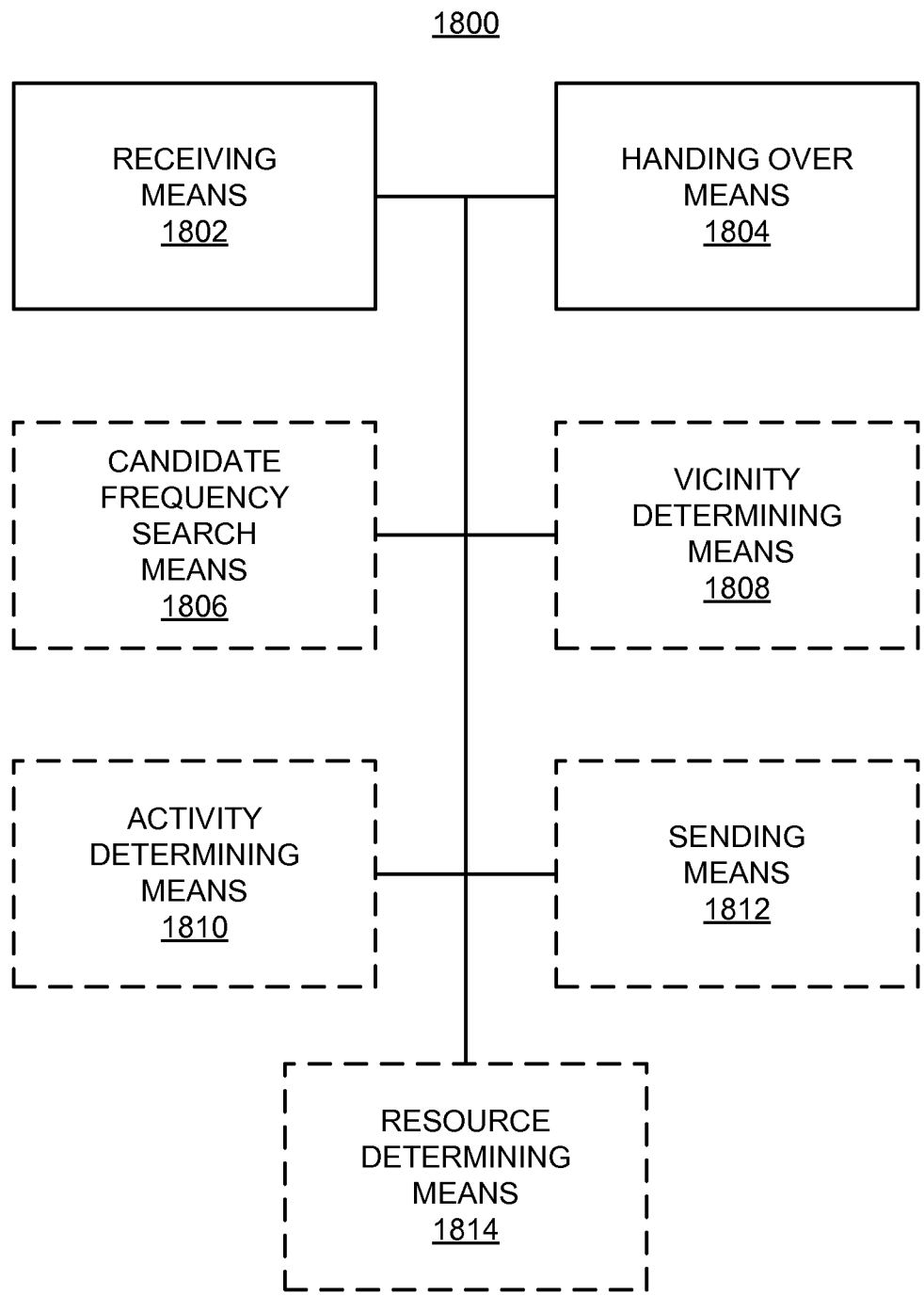
Figure 19:
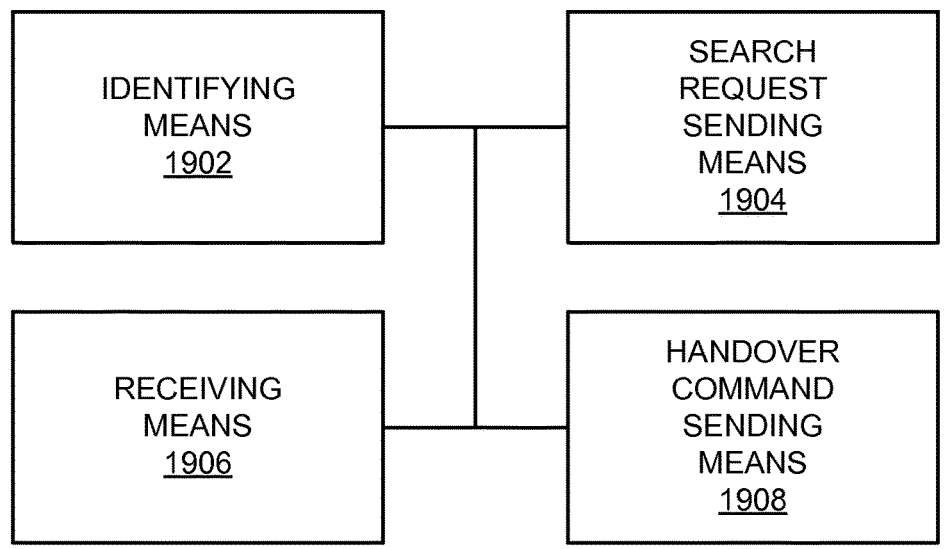
Figure 20:
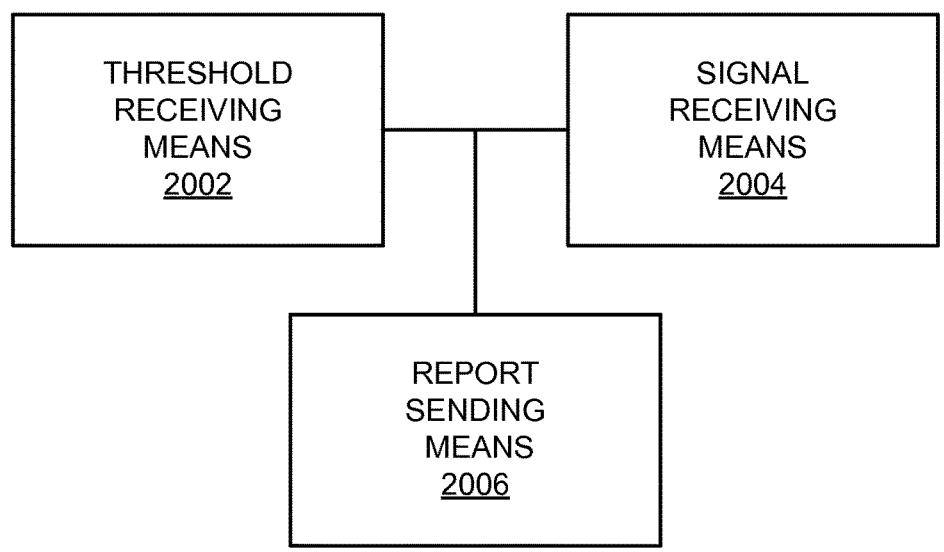

For illustration purposes, FIG. 16 describes sample communication components that may be employed in a wireless device in the context of a MIMO-based system 800. The system 1600 employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min \{N_T, N_R\}$. Each of the Ns independent channels corresponds to a dimension. The MIMO system may provide improved performance (e.g., higher throughput and/or greater reliability) if the additional dimensionalities created by the multiple transmit and receive antennas are utilized.

The system 1600 may support time division duplex ("TDD") and frequency division duplex ("FDD"). In a TDD system, the forward and reverse link transmissions are on the same frequency region so that the reciprocity principle allows the estimation of the forward link channel from the reverse link channel. This enables the access point to extract transmit beam-forming gain on the forward link when multiple antennas are available at the access point.

The system 1600 includes a wireless device 1610 (e.g., an access point) and a wireless device 1650 (e.g., an access terminal). At the device 1610, traffic data for a number of data streams is provided from a data source 1612 to a transmit ("TX") data processor 1614.

In some aspects, each data stream is transmitted over a respective transmit antenna. The TX data processor 1614 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by a processor 1630. A data memory 1632 may store program code, data, and other information used by the processor 1630 or other components of the device 1610.

The modulation symbols for all data streams are then provided to a TX MIMO processor 1620, which may further process the modulation symbols (e.g., for OFDM). The TX MIMO processor 1620 then provides $N_T$ modulation symbol streams to $N_T$ transceivers ("XCVR") 1622A through 1622T. In some aspects, the TX MIMO processor 1620 applies beam-forming weights to the symbols of the data streams and to the antenna from which the symbol is being transmitted.

Each transceiver 1622 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transceivers 1622A through 1622T are then transmitted from $N_T$ antennas 1624A through 1624T, respectively.

At the device 1650, the transmitted modulated signals are received by $N_R$ antennas 1652A through 1652R and the received signal from each antenna 1652 is provided to a respective transceiver ("XCVR") 1654A through 1654R. Each transceiver 1654 conditions (e.g., filters, amplifies, and downconverts) a respective received signal, digitizes the conditioned signal to provide samples, and further processes the samples to provide a corresponding "received" symbol stream.

A receive ("RX") data processor 1660 then receives and processes the $N_R$ received symbol streams from $N_R$ transceivers 1654 based on a particular receiver processing technique to provide $N_T$ "detected" symbol streams. The RX data processor 1660 then demodulates, deinterleaves, and decodes each detected symbol stream to recover the traffic data for the data stream. The processing by the RX data processor 1660 is complementary to that performed by the TX MIMO processor 1620 and the TX data processor 1614 at the device 1610.

A processor 1670 periodically determines which precoding matrix to use (discussed below). The processor 1670 formulates a reverse link message comprising a matrix index portion and a rank value portion. A data memory 1672 may store program code, data, and other information used by the processor 1670 or other components of the device 1650.

The reverse link message may comprise various types of information regarding the communication link and/or the received data stream. The reverse link message is then processed by a TX data processor 1638, which also receives traffic data for a number of data streams from a data source 1636, modulated by a modulator 1680, conditioned by the transceivers 1654A through 1654R, and transmitted back to the device 1610.

At the device 1610, the modulated signals from the device 1650 are received by the antennas 1624, conditioned by the transceivers 1622, demodulated by a demodulator ("DEMOD") 1640, and processed by a RX data processor 1642 to extract the reverse link message transmitted by the device 1650. The processor 1630 then determines which pre-coding matrix to use for determining the beam-forming weights then processes the extracted message.

FIG. 16 also illustrates that the communication components may include one or more components that perform handover control operations as taught herein. For example, a handover control component 1690 may cooperate with the processor 1630 and/or other components of the device 1610 to send/receive signals to/from another device (e.g., device 1650) as taught herein. Similarly, a handover control component 1692 may cooperate with the processor 1670 and/or other components of the device 1650 to send/receive signals to/from another device (e.g., device 1610). It should be appreciated that for each device 1610 and 1650 the functionality of two or more of the described components may be provided by a single component. For example, a single processing component may provide the functionality of the handover control component 1690 and the processor 1630 and a single processing component may provide the functionality of the handover control component 1692 and the processor 1670.

The teachings herein may be incorporated into various types of communication systems and/or system components. In some aspects, the teachings herein may be employed in a multiple-access system capable of supporting communication with multiple users by sharing the available system resources (e.g., by specifying one or more of bandwidth, transmit power, coding, interleaving, and so on). For example, the teachings herein may be applied to any one or combinations of the following technologies: Code Division Multiple Access ("CDMA") systems, Multiple-Carrier CDMA ("MCCDMA"), Wideband CDMA ("W-CDMA"), High-Speed Packet Access ("HSPA," "HSPA+") systems, Time Division Multiple Access ("TDMA") systems, Frequency Division Multiple Access ("FDMA") systems, Single-Carrier FDMA ("SC-FDMA") systems, Orthogonal Frequency Division Multiple Access ("OFDMA") systems, or other multiple access techniques. A wireless communication system employing the teachings herein may be designed to implement one or more standards, such as IS-95, cdma2000, IS-856, W-CDMA, TDSCDMA, and other standards. A CDMA network may implement a radio technology such as Universal Terrestrial Radio Access ("UTRA)", cdma2000, or some other technology. UTRA includes W-CDMA and Low Chip Rate ("LCR"). The cdma2000 technology covers IS-2000, IS-95 and IS-856 standards. A TDMA network may implement a radio technology such as Global System for Mobile Communications ("GSM"). An OFDMA network may implement a radio technology such as Evolved UTRA ("E-UTRA"), IEEE 802.11, IEEE 802.16, IEEE 802.20, Flash-OFDM®, etc. UTRA, E-UTRA, and GSM are part of Universal Mobile Telecommunication System ("UMTS"). The teachings herein may be implemented in a 3GPP Long Term Evolution ("LTE") system, an Ultra-Mobile Broadband ("UMB") system, and other types of systems. LTE is a release of UMTS that uses E-UTRA. Although certain aspects of the disclosure may be described using 3GPP terminology, it is to be understood that the teachings herein may be applied to 3GPP (Rel99, Rel5, Rel6, Rel7) technology, as well as 3GPP2 (IxRTT, IxEV-DO RelO, RevA, RevB) technology and other technologies.

The teachings herein may be incorporated into (e.g., implemented within or performed by) a variety of apparatuses (e.g., nodes). In some aspects, a node (e.g., a wireless node) implemented in accordance with the teachings herein may comprise an access point or an access terminal.

For example, an access terminal may comprise, be implemented as, or known as user equipment, a subscriber station, a subscriber unit, a mobile station, a mobile, a mobile node, a remote station, a remote terminal, a user terminal, a user agent, a user device, or some other terminology. In some implementations an access terminal may comprise a cellular telephone, a cordless telephone, a session initiation protocol ("SIP") phone, a wireless local loop ("WLL") station, a personal digital assistant ("PDA"), a handheld device having wireless connection capability, or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), an entertainment device (e.g., a music device, a video device, or a satellite radio), a global positioning system device, or any other suitable device that is configured to communicate via a wireless medium.

An access point may comprise, be implemented as, or known as a NodeB, an eNodeB, a radio network controller ("RNC"), a base station ("BS"), a radio base station ("RBS"), a base station controller ("BSC"), a base transceiver station ("BTS"), a transceiver function ("TF"), a radio transceiver, a radio router, a basic service set ("BSS"), an extended service set ("ESS"), or some other similar terminology.

In some aspects a node (e.g., an access point) may comprise an access node for a communication system. Such an access node may provide, for example, connectivity for or to a network (e.g., a wide area network such as the Internet or a cellular network) via a wired or wireless communication link to the network. Accordingly, an access node may enable another node (e.g., an access terminal) to access a network or some other functionality. In addition, it should be appreciated that one or both of the nodes may be portable or, in some cases, relatively non-portable.

Also, it should be appreciated that a wireless node may be capable of transmitting and/or receiving information in a non-wireless manner (e.g., via a wired connection). Thus, a receiver and a transmitter as discussed herein may include appropriate communication interface components (e.g., electrical or optical interface components) to communicate via a non-wireless medium.

A wireless node may communicate via one or more wireless communication links that are based on or otherwise support any suitable wireless communication technology. For example, in some aspects a wireless node may associate with a network. In some aspects the network may comprise a local area network or a wide area network. A wireless device may support or otherwise use one or more of a variety of wireless communication technologies, protocols, or standards such as those discussed herein (e.g., CDMA, TDMA, OFDM, OFDMA, WiMAX, Wi-Fi, and so on). Similarly, a wireless node may support or otherwise use one or more of a variety of corresponding modulation or multiplexing schemes. A wireless node may thus include appropriate components (e.g., air interfaces) to establish and communicate via one or more wireless communication links using the above or other wireless communication technologies. For example, a wireless node may comprise a wireless transceiver with associated transmitter and receiver components that may include various components (e.g., signal generators and signal processors) that facilitate communication over a wireless medium.

The components described herein may be implemented in a variety of ways. Referring to FIGS. 17-20, apparatuses 1700, 1800, 1900, and 2000 are represented as a series of interrelated functional blocks. In some aspects the functionality of these blocks may be implemented as a processing system including one or more processor components. In some aspects the functionality of these blocks may be implemented using, for example, at least a portion of one or more integrated circuits (e.g., an ASIC). As discussed herein, an integrated circuit may include a processor, software, other related components, or some combination thereof. The functionality of these blocks also may be implemented in some other manner as taught herein. In some aspects one or more of the dashed blocks in FIGS. 17-20 are optional.

The apparatuses 1700, 1800, 1900, and 2000 may include one or more modules that may perform one or more of the functions described above with regard to various figures. For example, a monitoring means 1702 may correspond to, for example, a monitor as discussed herein. A handover message sending means 1704 may correspond to, for example, a handover controller as discussed herein. A receiving means 1706 may correspond to, for example, a receiver as discussed herein. A detecting means 1708 may correspond to, for example, a receiver as discussed herein. A vicinity determining means 1710 may correspond to, for example, a proximity determiner as discussed herein. A receiving means 1802 may correspond to, for example, a receiver as discussed herein. A handing over means 1804 may correspond to, for example, a handover controller as discussed herein. A candidate frequency search means 1806 may correspond to, for example, a candidate frequency search controller as discussed herein. A vicinity determining means 1808 may correspond to, for example, a proximity determiner as discussed herein. An activity determining means 1810 may correspond to, for example, a communication controller as discussed herein. A sending means 1812 may correspond to, for example, a transmitter as discussed herein. A resource determining means 1814 may correspond to, for example, a communication controller as discussed herein. An identifying means 1902 may correspond to, for example, a handover controller as discussed herein. A search request sending means 1904 may correspond to, for example, a candidate frequency search controller as discussed herein. A receiving means 1906 may correspond to, for example, a receiver as discussed herein. A handover command sending means 1908 may correspond to, for example, a handover controller as discussed herein. A threshold receiving means 2002 may correspond to, for example, a receiver as discussed herein. A signal receiving means 2004 may correspond to, for example, a receiver as discussed herein. A report sending means 2006 may correspond to, for example, a transmitter as discussed herein.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements. In addition, terminology of the form "at least one of: A, B, or C" used in the description or the claims means "A or B or C or any combination of these elements."

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that any of the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media. In summary, it should be appreciated that a computer-readable medium may be implemented in any suitable computer-program product.

In view of the above, in some aspects a first method of communication comprises: monitoring, at a first node, at least one resource to detect a second node; sending a message to redirect the second node to the first node in response to the detection of the second node. In addition, in some aspects at least one of the following also may apply to the first method of communication: the at least one resource comprises at least one channel and/or at least one scrambling code; the at least one resource comprises a frequency band and the monitoring comprises tuning to the frequency band to detect a signal transmitted by the second node; the method further comprises receiving a message that indicates that the at least one resource is assigned to the second node; the method further comprises receiving an indication that the second node is currently active, wherein the monitoring is commenced as a result of the receipt of the indication; the method further comprises receiving an indication that the second node is within a vicinity of the first node, wherein the monitoring is commenced as a result of the receipt of the indication; the monitoring further comprises: detecting a pilot strength measurement message transmitted by the second node and/or detecting a candidate frequency report transmitted by the second node, determining whether the second node is in a vicinity of the first node based on the detected pilot strength measurement message and/or the detected candidate frequency report, and determining whether to send the message based on the vicinity determination; the first node comprises a femto node, the second node comprises an access terminal, and the message comprises a request to commence a handover of the access terminal from a macro access point to the femto node.

In some aspects a second method of communication comprises: receiving a signal from an access terminal at a first access point; and sending a message, as a result of the receipt of the signal, to trigger a handover operation at a second access point. In addition, in some aspects at least one of the following also may apply to the second method of communication: the message comprises a request to initiate a candidate frequency search at the access terminal; the method further comprises: detecting a pilot strength measurement message transmitted by the access terminal and/or detecting a candidate frequency report transmitted by the access terminal, determining whether the access terminal is in a vicinity of the first access point based on the detected pilot strength measurement message and/or the detected candidate frequency report, and determining whether to send the message based on the vicinity determination; the message comprises: an indication that the first access point received the signal from the access terminal, and at least one metric indicative of a location of the first access point; the at least one metric relates to at least one of the group consisting of: a pilot strength measurement, a round trip delay, and a GPS coordinate; the first access point comprises a femto node, and the second access point comprises a macro access point.

In some aspects a third method of communication comprises: receiving, at a first access point, a message from a second access point that triggers a handover operation for an access terminal; and handing over the access terminal to the second access point as a result of the receipt of the message. In addition, in some aspects at least one of the following also may apply to the third method of communication: the message comprises a request to hand over the access terminal to the second access point; the message comprises a request to initiate a candidate frequency search at the access terminal, the method further comprising: sending a request to the access terminal to perform the candidate frequency search, receiving a candidate frequency search report in response to the request, and determining whether to hand over the access terminal to the second access point based on the candidate frequency search report; the message comprises an indication that the second access point received a signal from the access terminal, the message further comprises at least one metric indicative of a location of the second access point, the method further comprises determining whether the access terminal is in a vicinity of the second access point based on the at least one metric, and the method further comprises determining whether to hand over the access terminal based on the vicinity determination; the determination of whether the access terminal is in the vicinity of the second access point comprises: sending a request to the access terminal to perform a candidate frequency search, receiving a candidate frequency search report in response to the request, and comparing the at least one metric with information from the candidate frequency search report; the determination of whether the access terminal is in the vicinity of the second access point comprises: determining at least one round trip delay associated with the access terminal, and comparing the at least one metric with the at least one round trip delay; the method further comprises: determining whether the access terminal is in a vicinity of the second access point, and sending an indication of the vicinity determination to the second access point; the method further comprises: determining whether the access terminal is active, and sending an indication that the access terminal is active to the second access point; the method further comprises: determining at least one resource assigned to the access terminal, and sending an indication of the at least one resource to the second access point; the at least one resource comprises at least one channel and/or at least one scrambling code; the first access point comprises a macro access point, and the second access point comprises a femto node.

In some aspects a fourth method of communication comprises: identifying an access terminal to be handed over; sending a request to the access terminal to perform a candidate frequency search; receiving a response to the request, wherein the response identifies a plurality of access points that use an identical identifier; and sending a handover command to each of the identified access points. In addition, in some aspects at least one of the following also may apply to the fourth method of communication: the identification of the access terminal comprises determining whether the access terminal is in a vicinity of an access point that uses the identifier; the sending of a handover command to each of the identified access points comprises sending identical sets of channel assignment parameters to the identified access points; the identifier comprises a PN sequence; the access points comprise femto nodes.

In some aspects a fifth method of communication comprises: receiving a threshold from a first access point, wherein the threshold is associated with a defined set of at least one access point; receiving a signal from a second access point, wherein the second access point is a member of the set; sending a report to the first access point indicative of the received signal if a signal level of the received signal is greater than or equal to the threshold. In addition, in some aspects at least one of the following also may apply to the fifth method of communication: the threshold is specific to the second access point; the set is restricted to femto nodes; the signal comprises a pilot signal; the first access point comprises a macro access point, and the second access point comprises a femto node.

In some aspects, functionality corresponding to one or more of the above aspects relating to the first, second, third, fourth, and fifth methods of communication may be implemented, for example, in an apparatus using structure as taught herein. In addition, a computer-program product may comprise codes configured to cause a computer to provide functionality corresponding to one or more of the above aspects relating to the first, second, third, fourth, and fifth methods of communication.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the scope of the disclosure. Thus, the present disclosure is not intended to be limited to the aspects shown herein but is to be accorded the widest scope consistent with the principles and novel features disclosed herein.

What is claimed is:

1. A method of communication, comprising:
monitoring, at a target access point, at least one resource to detect an access terminal;
determining, at the target access point and based on the monitoring, whether the access terminal is in a vicinity of the target access point for triggering a handover operation; and
reporting, by the target access point and to a source access point via a macro network and based on the determination that the access terminal is in the vicinity of the target access point, a message that indicates the access terminal is in the vicinity of the target access point, wherein the message includes at least first metric information related to the target access point based on the at least one monitored resource and includes a candidate frequency search request to the access terminal,
the message from the target access point to the source access point being used by the source access point to send the candidate frequency search request to the access terminal, the candidate frequency search request configured for causing the access terminal to perform a candidate frequency search;
to receive, from the access terminal, second metric information based on the candidate frequency search request, the second metric information comprising information relating to one or more pilot signals received by the access terminal;
to determine, at the source access point, that the access terminal is in the vicinity of the target access point based at least in part on a comparison of the first metric information and the second metric information; and
to invoke the handover operation to hand over the access terminal from the source access point to the target access point after the candidate frequency search performed by the access terminal based on the candidate frequency search request included in the message, and based on at least in part on the determination that the access terminal is in the vicinity of the target access point.

2. The method of claim 1, wherein the at least one resource comprises at least one channel and/or at least one scrambling code.

3. The method of claim 1, wherein
the at least one resource comprises a frequency band, and
the monitoring further comprises:
tuning to the frequency band to detect a signal transmitted by the access terminal.

4. The method of claim 1, further comprising:
receiving an additional message that indicates that the at least one resource is assigned to the access terminal.

5. The method of claim 1, further comprising:
receiving an indication that the access terminal is currently active,
wherein the monitoring is commenced as a result of receiving the indication.

6. The method of claim 1, further comprising:
detecting a pilot strength measurement message transmitted by the access terminal; and
determining whether the access terminal is in the vicinity of the target access point further based on the detected pilot strength measurement message.

7. The method of claim 6, wherein the pilot strength measurement message indicates a signal strength of a pilot signal received at the access terminal.

8. The method of claim 1, wherein the message further comprises:
an indication that the target access point received a signal from the access terminal, and
at least one metric indicative of a location of the target access point.

9. The method of claim 8, wherein the at least one metric relates to at least one of:
a pilot strength measurement,
a round trip delay, or
a GPS coordinate.

10. The method of claim 1, wherein the target access point comprises a femto node.

11. The method of claim 1, further comprising:
comparing a measurement of a pilot signal received at the target access point from the source access point with a measurement of a pilot signal received at the access terminal from the source access point,
wherein determining, by the target access point, whether the access terminal is in the vicinity of the target access point is further based on the comparison.

12. An apparatus for communication, comprising:
a monitor, of a target access point, configured to:
monitor at least one resource to detect an access terminal;
a proximity determiner, of the target access point, configured to:
determine, based on the monitoring, whether the access terminal is in a vicinity of the target access point for triggering a handover operation based on the monitoring; and
a handover controller, of the target access point, configured to:
report, to a source access point via a macro network and based on the determination that the access terminal is in the vicinity of the target access point, a message that indicates the access terminal is in the vicinity of the target access point, wherein the message includes at least first metric information related to the target access point based on the at least one monitored resource and includes a candidate frequency search request to the access terminal,
the message from the target access point to the source access point being used by the source access point to send the candidate frequency search request to the access terminal, the candidate frequency search request configured for causing the access terminal to perform a candidate frequency search;
to receive, from the access terminal, second metric information based on the candidate frequency search request, the second metric information comprising information relating to one or more pilot signals received by the access terminal;
to determine, at the source access point, that the access terminal is in the vicinity of the target access point based at least in part on a comparison of the first metric information and the second metric information; and
to invoke the handover operation to hand over the access terminal from the source access point to the target access point after the candidate frequency search performed by the access terminal based on the candidate frequency search request included in the message, and based on at least in part on the determination that the access terminal is in the vicinity of the target access point.

13. The apparatus of claim 12, wherein the at least one resource comprises at least one channel and/or at least one scrambling code.

14. The apparatus of claim 12, wherein
the at least one resource comprises a frequency band, and
the monitor is further configured to tune to the frequency band to detect a signal transmitted by the access terminal.

15. The apparatus of claim 12, further comprising:
a receiver configured to receive an additional message that indicates that the at least one resource is assigned to the access terminal.

16. The apparatus of claim 12, further comprising:
a receiver configured to receive an indication that the access terminal is currently active,
wherein the monitor is further configured to commence monitoring the at least one resource as a result of receiving the indication.

17. The apparatus of claim 12, further comprising:
a receiver configured to detect a pilot strength measurement message transmitted by the access terminal and/or a candidate frequency report transmitted by the access terminal,
wherein the proximity determiner is further configured to determine whether the access terminal is in the vicinity of the target access point further based on the detected pilot strength measurement message and/or the detected candidate frequency report.

18. The apparatus of claim 12, wherein the message further comprises:
an indication that the target access point received a signal from the access terminal, and
at least one metric indicative of a location of the target access point.

19. The apparatus of claim 18, wherein the at least one metric relates to at least one of:
a pilot strength measurement,
a round trip delay, or
a GPS coordinate.

20. An apparatus for communication, comprising:
means for monitoring, at a target access point, at least one resource to detect an access terminal;
means for determining, at the target access point and based on the monitoring, whether the access terminal is in a vicinity of the target access point for triggering a handover operation; and
means for reporting, by the target access point to a source access point and based on the determination that the access terminal is in the vicinity of the target access point, a message that indicates the access terminal is in the vicinity of the target access point, wherein the message includes at least first metric information related to the target access point based on the at least one monitored resource and includes a candidate frequency search request to the access terminal,
the message from the target access point to the source access point being used by the source access point to send the candidate frequency search request to the access terminal, the candidate frequency search request configured for causing the access terminal to perform a candidate frequency search;
to receive, from the access terminal, second metric information based on the candidate frequency search request, the second metric information comprising information relating to one or more pilot signals received by the access terminal;
to determine, at the source access point, that the access terminal is in the vicinity of the target access point based at least in part on a comparison of the first metric information and the second metric information; and
to invoke the handover operation to hand over the access terminal from the source access point to the target access point after the candidate frequency search performed by the access terminal based on the candidate frequency search request included in the message, and based on at least in part on the determination that the access terminal is in the vicinity of the target access point.

21. The apparatus of claim 20, wherein the at least one resource comprises at least one channel and/or at least one scrambling code.

22. The apparatus of claim 20, wherein
the at least one resource comprises a frequency band, and
the means for monitoring further comprises means for tuning to the frequency band to detect a signal transmitted by the access terminal.

23. The apparatus of claim 20, further comprising means for receiving an additional message that indicates that the at least one resource is assigned to the access terminal.

24. The apparatus of claim 20, further comprising:
means for receiving an indication that the access terminal is currently active,
wherein the monitoring is commenced as a result of receiving the indication.

25. The apparatus of claim 20, further comprising:
means for detecting a pilot strength measurement message transmitted by the access terminal and/or a candidate frequency report transmitted by the access terminal,
wherein the means for determining whether the access terminal is in the vicinity of the target access point includes means for determining whether the access terminal is in the vicinity of the target access point based on at least one of the detected pilot strength measurement message or the detected candidate frequency report.

26. The apparatus of claim 20, wherein the message further comprises:
an indication that the target access point received a signal from the access terminal, and
at least one metric indicative of a location of the target access point.

27. The apparatus of claim 26, wherein the at least one metric relates to at least one of:
a pilot strength measurement,
a round trip delay, or
a GPS coordinate.

28. A non-transitory computer-readable medium storing instructions, the instructions comprising:
one or more instructions which, when executed by a processor of a target access point, cause the processor to:
monitor at least one resource to detect an access terminal;
determine, based on the monitoring, whether the access terminal is in a vicinity of the target access point for triggering a handover operation; and
report, to a source access point and based on the determination that the access terminal is in the vicinity of the target access point, a message that indicates the access terminal is in the vicinity of the target access point, wherein the message includes at least first metric information related to the target access point based on the at least one monitored resource and includes a candidate frequency search request to the access terminal, the message from the target access point to the source access point being used by the source access point to send the candidate frequency search request to the access terminal, the candidate frequency search request configured for causing the access terminal to perform a candidate frequency search;

to receive, from the access terminal, second metric information based on the candidate frequency search request, the second metric information comprising information relating to one or more pilot signals received by the access terminal;

to determine, at the source access point, that the access terminal is in the vicinity of the target access point based at least in part on a comparison of the first metric information and the second metric information; and to invoke the handover operation to hand over the access terminal from the source access point to the target access point after the candidate frequency search performed by the access terminal based on the candidate frequency search request included in the message, and based on at least in part on the determination that the access terminal is in the vicinity of the target access point.

29. The non-transitory computer-readable medium of claim 28, wherein the at least one resource comprises at least one channel and/or at least one scrambling code.

30. The non-transitory computer-readable medium of claim 28, wherein
the at least one resource comprises a frequency band, and
the instructions further include:
one or more instructions to tune to the frequency band to detect a signal transmitted by the access terminal.

31. The non-transitory computer-readable medium of claim 28, wherein the instructions further include:
one or more instructions to receive an additional message that indicates that the at least one resource is assigned to the access terminal.

32. The non-transitory computer-readable medium of claim 28, wherein the instructions further include:
one or more instructions to receive an indication that the access terminal is currently active and
the one or more instructions to monitor the at least one resource include:
one or more instructions to commence monitoring the at least one resource as a result of receiving the indication.

33. The non-transitory computer-readable medium of claim 28, wherein the instructions further include:
one or more instructions to detect at least one of a pilot strength measurement message transmitted by the access terminal or a candidate frequency report transmitted by the access terminal; and
one or more instructions to determine whether the access terminal is in vicinity of the target access point further based on the at least one of the detected pilot strength measurement message or the detected candidate frequency report.

34. The non-transitory computer-readable medium of claim 28, wherein the message further comprises:
an indication that the target access point received a signal from the access terminal, and
at least one metric indicative of a location of the target access point.

35. The non-transitory computer-readable medium of claim 34, wherein the at least one metric relates to at least one of:
a pilot strength measurement,
a round trip delay, or
a GPS coordinate.

36. A method of communication, comprising:
receiving, at a source access point and from a target access point via a macro network, a message reporting that an access terminal is in a vicinity of the target access point, the message comprising first metric information related to the target access point and being based on at least one monitored resource and a candidate frequency search request to the access terminal, wherein the message is reported by the target access point based on the target access point's determination that the access terminal is in the vicinity of the target access point, the determination being based on the at least one resource monitored by the target access terminal to detect the access terminal;
sending, by the source access point and based on receiving the message, the candidate frequency search request to the access terminal, the candidate frequency search request configured for causing the access terminal to perform a candidate frequency search;
receiving, by the source access point and from the access terminal, second metric information based on the candidate frequency search request, the second metric information comprising information relating to one or more pilot signals received by the access terminal;
determining, at the source access point, that the access terminal is in the vicinity of the target access point based at least in part on a comparison of the first metric information and the second metric information; and
handing over, by the source access point, the access terminal to the target access point based at least in part on a determination that the access terminal is in the vicinity of the target access point.

37. The method of claim 36, wherein the message further comprises a request to hand over the access terminal to the target access point.

38. The method of claim 36, wherein
the message further comprises an indication that the target access point received a signal from the access terminal,
the message further comprises at least one metric indicative of a location of the target access point, and
the method further includes:
verifying that the access terminal is in the vicinity of the target access point is based on the at least one metric.

39. The method of claim 38, wherein determining whether the access terminal is in the vicinity of the target access point further comprises:
determining at least one round trip delay associated with the access terminal; and
comparing the at least one metric with the at least one round trip delay.

40. The method of claim 36, further comprising:
sending an indication of the determination that the access terminal is in the vicinity of the target access point to the target access point.

41. The method of claim 36, further comprising:
determining whether the access terminal is active; and
sending an indication that the access terminal is active to the target access point.

42. The method of claim 36, further comprising:
determining at least one resource assigned to the access terminal; and sending an indication of the at least one resource to the target access point.

43. The method of claim 42, wherein the at least one resource comprises at least one channel and/or at least one scrambling code.

44. The method of claim 36, wherein:
the source access point comprises a macro access point; and
the target access point comprises a femto node.

45. An apparatus for communication, comprising:
a receiver, of a source access point, configured to:
receive, from a target access point and via a macro network, a message reporting that an access terminal is in a vicinity of the target access point, the message comprising first metric information related to the target access point and being based on at least one monitored resource and a candidate frequency search request to the access terminal, wherein the message is reported by the target access point based on the target access point's determination that the access terminal is in the vicinity of the target access point, the determination being based on the at least one resource monitored by the target access terminal to detect the access terminal;
a transmitter, of the source access point, configured to:
send, based on receiving the message, the candidate frequency search request to the access terminal, the candidate frequency search request configured for causing the access terminal to perform a candidate frequency search;
the receiver being further configured to:
receive, from the access terminal, second metric information, wherein the second metric information comprises information relating to one or more pilot signals received by the access terminal in response to the candidate frequency search;
a proximity determiner, of the source access point, configured to:
determine that the access terminal is in the vicinity of the target access point based at least in part on a comparison of the first metric information and the second metric information; and
a handover controller, of the source access point, configured to:
hand over the access terminal to the target access point based at least in part on a determination that the access terminal is in the vicinity of the target access point.

46. The apparatus of claim 45, wherein the message further comprises a request to hand over the access terminal to the target access point.

47. The apparatus of claim 45, wherein
the message further comprises an indication that the target access point received a signal from the access terminal,
the message further comprises at least one metric indicative of a location of the target access point, and
a verification that the access terminal is in the vicinity of the target access point is based on the at least one metric.

48. The apparatus of claim 47, wherein the proximity determiner is further configured to:
determine at least one round trip delay associated with the access terminal; and
compare the at least one metric with the at least one round trip delay.

49. The apparatus of claim 45, wherein the proximity determiner is further configured to:

send an indication of the vicinity determination that the access terminal is in the vicinity of the target access point to the target access point.

50. The apparatus of claim 45, further comprising:
a communication controller configured to:
determine whether the access terminal is active; and
send an indication that the access terminal is active to the target access point.

51. The apparatus of claim 45, further comprising:
a communication controller configured to:
determine at least one resource assigned to the access terminal; and
send an indication of the at least one resource to the target access point.

52. The apparatus of claim 51, wherein the at least one resource comprises at least one channel and/or at least one scrambling code.

53. An apparatus for communication, comprising:
means for receiving, from a target access point and via a macro network, a message reporting that an access terminal is in a vicinity of the target access point, the message comprising first metric information related to the target access point and being based on at least one monitored resource and a candidate frequency search request to the access terminal, wherein the message is reported by the target access point based on the target access point's determination that the access terminal is in the vicinity of the target access point, the determination being based on the at least one resource monitored by the target access terminal to detect the access terminal;
means for sending, based on receiving the message, the candidate frequency search request to the access terminal, the candidate frequency search request configured for causing the access terminal to perform a candidate frequency search;
the means for receiving further including means for receiving, from the access terminal, second metric information, wherein the second metric information comprises information relating to one or more pilot signals received by the access terminal in response to the candidate frequency search;
means for determining, at the source access point, that the access terminal is in the vicinity of the target access point based at least in part on a comparison of the first metric information and the second metric information; and
means for handing over the access terminal to the target access point based at least in part on a determination that the access terminal is in the vicinity of the target access point.

54. The apparatus of claim 53, wherein the message further comprises a request to hand over the access terminal to the target access point.

55. The apparatus of claim 53, wherein
the message comprises an indication that the target access point received a signal from the access terminal,
the message further comprises at least one metric indicative of a location of the target access point, and
the apparatus further includes:
means for verifying that the access terminal is in the vicinity of the target access point based on the at least one metric.

56. The apparatus of claim 55, wherein the means for verifying that the access terminal is in the vicinity of the target access point further comprises:

means for determining at least one round trip delay associated with the access terminal; and means for comparing the at least one metric with the at least one round trip delay.

57. The apparatus of claim 53, further comprising:

means for sending an indication of the vicinity determination that the access terminal is in the vicinity of the target access point to the target access point.

58. The apparatus of claim 53, further comprising:

means for determining whether the access terminal is active; and means for sending an indication that the access terminal is active to the target access point.

59. The apparatus of claim 53, further comprising:

means for determining at least one resource assigned to the access terminal; and means for sending an indication of the at least one resource to the target access point.

60. The apparatus of claim 59, wherein the at least one resource comprises at least one channel and/or at least one scrambling code.

61. A non-transitory computer-readable medium storing instructions, the instructions comprising:

one or more instructions which, when executed by a processor of a source access point, cause the processor to:

receive, at the source access point and from a target access point via a macro network, a message reporting that an access terminal is in a vicinity of the target access point, the message comprising first metric information related to the target access point and being based on at least one monitored resource and a candidate frequency search request to the access terminal, wherein the message is reported by the target access point based on the target access point's determination that the access terminal is in the vicinity of the target access point, the determination being based on the at least one resource monitored by the target access terminal to detect the access terminal;

send, by the source access point and based on receiving the message, the candidate frequency search request to the access terminal, the candidate frequency search request configured for causing the access terminal to perform a candidate frequency search;

receive, by the source access point and from the access terminal, second metric information in response to the candidate frequency search request, the second metric information comprising information relating to one or more pilot signals received by the access terminal determine, at the source access point, that the access terminal is in the vicinity of the target access point based at least in part on a comparison of the first metric information and the second metric information; and hand over, by the source access point, the access terminal to the target access point based at least in part on a determination that the access terminal is in the vicinity of the target access point.

62. The non-transitory computer-readable medium of claim 61, wherein the message further comprises a request to hand over the access terminal to the target access point.

63. The non-transitory computer-readable medium of claim 61, wherein the message further comprises an indication that the target access point received a signal from the access terminal, the message further comprises at least one metric indicative of a location of the target access point, and the instructions further include:

one or more instructions to verify that the access terminal is in the vicinity of the target access point based on the at least one metric.

64. The non-transitory computer-readable medium of claim 63, wherein the instructions further include:

one or more instructions to determine at least one round trip delay associated with the access terminal based on the verification that the access terminal is in the vicinity of the target access point; and one or more instructions to compare the at least one metric with the at least one round trip delay.

* * * * *